United States Patent
Choi et al.

(10) Patent No.: US 12,245,185 B2
(45) Date of Patent: Mar. 4, 2025

(54) SIDELINK POSITIONING IN PRESENCE OF CLOCK ERROR

(71) Applicant: QUALCOMM Incorporated, San Diego, CA (US)

(72) Inventors: Chang-Sik Choi, Hillsborough, NJ (US); Kapil Gulati, Belle Mead, NJ (US); Sudhir Kumar Baghel, Hillsborough, NJ (US); Anantharaman Balasubramanian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 628 days.

(21) Appl. No.: 17/092,003

(22) Filed: Nov. 6, 2020

(65) Prior Publication Data
US 2022/0150863 A1 May 12, 2022

(51) Int. Cl.
| | |
|---|---|
| *H04W 64/00* | (2009.01) |
| *G01S 5/10* | (2006.01) |
| *H04L 12/26* | (2006.01) |
| *H04L 43/0864* | (2022.01) |

(52) U.S. Cl.
CPC ............ *H04W 64/003* (2013.01); *G01S 5/10* (2013.01); *H04L 43/0864* (2013.01)

(58) Field of Classification Search
CPC ..... H04W 64/003; H04L 43/0864; G01S 5/10
See application file for complete search history.

(56) References Cited

U.S. PATENT DOCUMENTS

| | | | |
|---|---|---|---|
| 2011/0018763 A1 | 1/2011 | Watanabe et al. | |
| 2013/0194931 A1* | 8/2013 | Lee | H04W 72/04 370/329 |
| 2014/0335885 A1* | 11/2014 | Steiner | H04W 64/00 455/456.1 |
| 2016/0029336 A1 | 1/2016 | Aldana et al. | |
| 2017/0332266 A1* | 11/2017 | Futaki | H04W 88/10 |
| 2020/0077238 A1* | 3/2020 | Alexander | H04W 4/40 |
| 2022/0196780 A1* | 6/2022 | Dwivedi | H04W 8/12 |
| 2022/0286255 A1* | 9/2022 | Guo | H04B 7/0626 |
| 2022/0361128 A1* | 11/2022 | Singh | H04W 56/001 |

OTHER PUBLICATIONS

International Search Report and Written Opinion—PCT/US2021/048252—ISA/EPO—Feb. 2, 2022.

* cited by examiner

*Primary Examiner* — Muthuswamy G Manoharan
(74) *Attorney, Agent, or Firm* — QUALCOMM Incorporated

(57) ABSTRACT

In one example, a method being performed by a first station and comprises: transmitting a first message including an indication of whether a clock reconfiguration event occurs at the first station; transmitting a first positioning reference signal (PRS); receiving from a second station a second PRS; and transmitting to the second station a second message including a first time when the first PRS is transmitted by the first station and a second time when the second PRS is received by the first station, to enable the second station to determine a roundtrip time (RTT) between the first station and the second station based on the first time, the second time, a third time when the second station receives the first PRS, a fourth time when the second station transmits the second PRS, and the indication.

43 Claims, 16 Drawing Sheets

SIDELINK POSITIONING IN PRESENCE OF CLOCK ERROR

BACKGROUND

Obtaining accurate position information for user equipment (UE), such as cellular telephones or other wireless communication devices, is becoming prevalent in the communications industry. A common means to determine the location of a device is to use a satellite positioning system (SPS), such as the well-known Global Positioning Satellite (GPS) system or a Global Navigation Satellite System (GNSS), which employs a number of satellites that are in orbit around the Earth. Location determination using an SPS is accurate, but sometimes is not available or desired, e.g., in urban canyons or areas with poor satellite signal reception. Other means commonly used to determine the location of a device include terrestrial-based positioning. Terrestrial-based positioning can be based on measurements of signals exchanged between the UE and nearby communication infrastructures of known positions, such as base stations (BSs) or roadside units (RSU). The accuracy of terrestrial-based positioning can be degraded by various sources of errors, such as clock errors between the UE and the transmitters.

BRIEF SUMMARY

In one example, a method is provided that comprises: transmitting, by a first station, a first message including an indication of whether a clock reconfiguration event occurs at the first station; transmitting, by the first station, a first positioning reference signal (PRS); receiving, by the first station and from a second station, a second PRS; and transmitting, by the first station to the second station, a second message including a first time when the first PRS is transmitted by the first station and a second time when the second PRS is received by the first station, to enable the second station to determine a roundtrip time (RTT) between the first station and the second station based on the first time, the second time, a third time when the second station receives the first PRS, a fourth time when the second station transmits the second PRS, and the indication.

In some aspects, the indication indicates whether the clock reconfiguration event occurs at the first station prior to the first station transmitting the first positioning reference.

In some aspects, the clock reconfiguration event is at a local clock source of the first station. The first time and the second time are obtained based on clock signals of the local clock source of the first station.

In some aspects, the second station includes a Kalman filter to estimate a clock error between the first station and the second station and store an estimate of the clock difference. The indication enables the second station to, based on the indication, perform one of the following: reset a prior estimate of the clock error stored in the Kalman filter to obtain an updated estimate of the clock difference, or use the prior estimate of the clock error to estimate the RTT in a QuasiColocation (QCL) operation.

In some aspects, the first message includes an identifier of the first station to enable the second station to determine a location of the first station based on the identifier.

In some aspects, the method further comprises determining a location of the second station based on the location of the first station and the RTT.

In some aspects, the first message includes one or more carrier frequencies used in the transmission of the first PRS.

In some aspects, the first message includes a scheduled time window of transmission of the first PRS. The first message is transmitted prior to the transmission of the first PRS.

In some aspects, the first PRS and the second PRS are transmitted via an unlicensed spectrum.

In some aspects, the first message is transmitted after the transmission of the first PRS.

In some aspects, the first PRS and the second PRS are transmitted via a vehicle-to-everything (V2X) sidelink and an associated sidelink protocol.

In some aspects, the V2X sidelink is within an intelligent transportation systems (ITS) frequency spectrum including 5.9 GHz.

In some aspects, the first station is part of a roadside unit (RSU), wherein the second station is part of a vehicle.

In one example, a method is provided. The method comprises: 1) receiving, by a first station from a second station, a first message including an indication of whether a clock reconfiguration event occurs at the second station; 2) transmitting, by the first station and to the second station, a first PRS; 3) receiving, by the first station and from the second station, a second PRS; 4) receiving, by the first station from the second station, a second message including a first time when the first PRS is received by the second station and a second time when the second PRS is transmitted by the second station; and 5) determining, by the first station, an RTT between the first station and the second station based on the first time, the second time, a third time when the first station transmits the first PRS, a fourth time when the first station receives the second PRS, and the indication.

In some aspects, the indication indicates whether the clock reconfiguration event occurs at the second station prior to the second station transmitting the second positioning reference.

In some aspects, the clock reconfiguration event is at a local clock source of the second station. The first time and the second time are obtained based on clock signals of the local clock source of the second station.

In some aspects, the first station includes a Kalman filter to estimate a clock error between the first station and the second station and to store an estimate of the clock difference. The method further comprises, based on the indication, performing one of the following: resetting a prior estimate of the clock error stored in the Kalman filter to obtain an updated estimate of the clock difference, or using the prior estimate of the clock error to estimate the RTT in a QCL operation.

In some aspects, the first message includes an identifier of the second station. The method further comprises determining a location of the second station based on the identifier.

In some aspects, the method further comprises determining a location of the first station based on the location of the second station and the RTT.

In some aspects, the first message includes one or more carrier frequencies used in the transmission of the second PRS.

In some aspects, the first message includes a scheduled time window of transmission of the second PRS. The first message is transmitted prior to the transmission of the second PRS.

In some aspects, the first PRS and the second PRS are transmitted via an unlicensed spectrum.

In some aspects, the first message is received after the second PRS is received.

In some aspects, the first PRS and the second PRS are transmitted via a V2X sidelink and an associated sidelink protocol. The V2X sidelink is within an ITS frequency spectrum including 5.9 GHz.

In some aspects, the first station is part of a vehicle, and wherein the second station is part of an RSU.

In some examples, an apparatus and non-transitory computer-readable medium comprising instructions for performing the aforementioned methods are provided.

DETAILED DESCRIPTION

Figure 1:
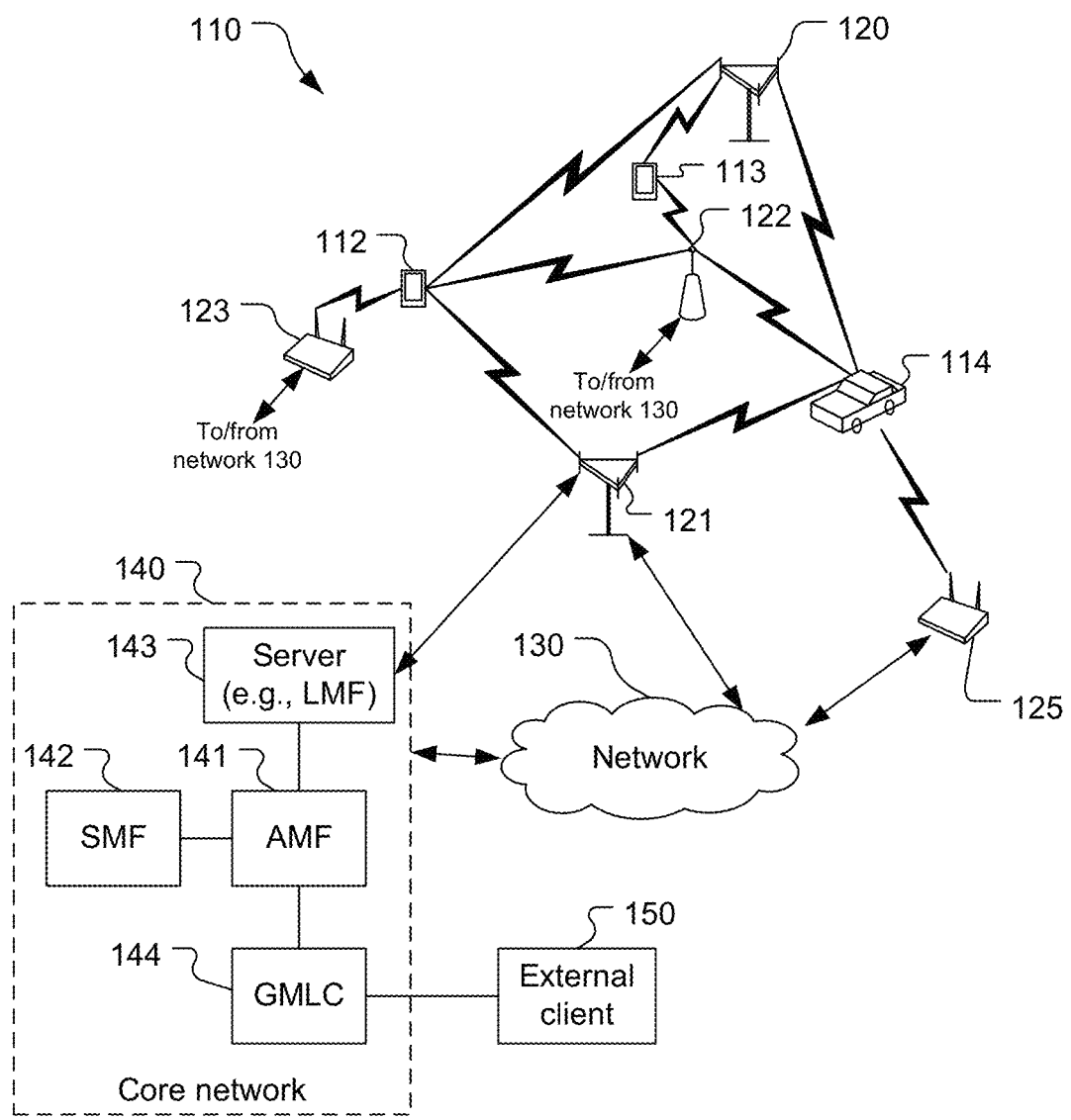
FIG. 1 is a schematic diagram of a connected-vehicle communication system.

Several illustrative embodiments will now be described with respect to the accompanying drawings, which form a part hereof. While particular embodiments, in which one or more aspects of the disclosure may be implemented, are described below, other embodiments may be used and various modifications may be made without departing from the scope of the disclosure or the spirit of the appended claims.

Techniques are discussed herein for a V2X sidelink positioning. A vehicle may be configured to communicate with a network including terrestrial stations such as base stations (BSs) and RSUs. One example of sidelink positioning can be based on measuring an RTT of a pair of signals exchanged between the vehicle and the terrestrial station, such as a RSU or a BS. In such an example, the terrestrial station can transmit a first signal to the vehicle and record the time of departure (ToD) of the first signal, while the vehicle can receive the first signal and record the time of arrival (ToA) of the first signal. In addition, the vehicle can also transmit a second signal to the terrestrial station and record the ToD of the second signal, while the terrestrial station can receive the second signal and record the ToA of the second signal. The terrestrial station can also transmit the recorded ToD of the first signal and the recorded ToA of the second signal to the vehicle via an intelligent transportation systems (ITS) message in a V2X implementation. The first and second signals can include, for example, position referencing signals (PRSs), which can be transmitted in licensed or unlicensed spectrums.

The vehicle can measure the RTT between the vehicle and the terrestrial station based on determining a first time difference between the ToA (recorded at the vehicle) and the ToD (received from the ITS message) of the first signal, and a second time difference between the ToD (recorded at the vehicle) and the ToA (received from the ITS message) of the second signal. The vehicle can repeat the RTT measurements with multiple terrestrial stations to determine time offsets between the PRSs from the multiple terrestrial stations based on differences between the RTT measurements. The vehicle can then estimate its position based on the time offsets and the known locations of the multiple terrestrial station.

The accuracy of the RTT measurements, as well as the accuracy of the position estimation of the vehicle, can be degraded by a clock error/difference between the vehicle and the terrestrial station. Specifically, the difference between the ToD recorded at the terrestrial station and the ToA recorded at the vehicle for the first signal, as well as the difference between the ToD recorded at the vehicle and the ToA recorded at the terrestrial station for the second signal, truly represents the time of flight (ToF) between the vehicle and the terrestrial station only if both the ToAs and ToDs are measured with respect to the same clock source. However, the vehicle and the terrestrial station have different clock sources which are necessarily synchronized with each other. As a result, the two clock sources may have a static clock bias between them, while each clock source may have a random clock drift caused by random noises (e.g., thermal noise, phase noise). The clock bias and clock drift can introduce clock errors between the two clock sources. As a result, the difference between the recorded ToD and ToA includes a first component representing the ToF of a signal between the terrestrial station and the vehicle as well as a second component caused by the clock error between the two clock sources.

A vehicle can employ techniques, such as Kalman filtering, to estimate both the distance between the vehicle and the terrestrial station as well as the clock error based on RTT measurements of multiple signals. Specifically, the terrestrial station and the vehicle can exchange multiple pairs of PRSs, and the ToDs and ToAs of the multiple pairs of PRSs can be recorded. The vehicle can use a Kalman filter to generate a first estimate of the clock error and the relative distance of the vehicle from the terrestrial station at a first time based on a first pair of the PRSs exchanged between the terrestrial station and the vehicle. The vehicle can then use the estimated clock error and relative distance, plus other information (e.g., the speed of the vehicle) to estimate the relative distance of the vehicle from the terrestrial station at a second time. The vehicle can also measure the relative distance at the second time based on a second pair of the PRSs. The vehicle can compare the measured and estimated relative distance, and update the estimation of the clock error based on the comparison result. The vehicle can then repeat the relative distance measurements and clock error estimation refinement based on subsequent pairs of first signal and second signal.

When the Kalman filter reaches a steady state, the estimated clock error can approach the actual clock error. The vehicle can then use the estimated clock error to refine the RTT measurements from subsequent PRSs exchanged between the vehicle and the terrestrial station, in a Quasi-CoLocation (QCL) operation at the vehicle for the subsequent signals. Through the QCL operation at the vehicle, the estimated clock error stored at the Kalman filter can be combined with the differences between the recorded ToAs and ToDs to compute the RTTs, without applying the Kalman filtering to compute the estimated clock error. This allows efficient reduction of the effect of clock error on the RTT measurement, as Kalman filtering can be computation intensive and slow.

Although the QCL operation can provide an efficient way to reduce the effect of clock error on the RTT measurement, the clock error reduction of the QCL operation can be compromised when the estimated clock error no longer corresponds to the actual clock error. This can happen when a clock reconfiguration event occurs at the terrestrial station. The clock reconfiguration event can include various events at the terrestrial station such as, for example, a power-up event of the terrestrial station, a clock synchronization event of the terrestrial station, or a reconfiguration event of the local oscillator, all of which can change the properties of the local clock at the terrestrial station. As the properties of the local clock at the terrestrial station change, the clock error between the terrestrial station and the vehicle may change, and the clock error estimated from prior exchange of PRSs may no longer represent the true clock error. Using the outdated clock error estimate to refine the RTT measurement can increase the error in the RTT measurement as well as the positioning operation.

Examples of the present disclosure provide a positioning method that can address at least some of the issues above. In one example, a first station, which can be a terrestrial station (e.g., RSU, BS), can transmit a first message including an indication of whether a clock reconfiguration event occurs at the first station. The first station can transmit a first PRS to a second station, which can be a wireless station of a vehicle, and receive a second PRS from the second station. The first station can then transmit to the second station a second message indicating a ToD of the first PRS and a ToA of the second PRS at the first station. The second station can then determine RTT between the first station and the second station based on a first difference between the ToD (from the second message) and the ToA (recorded at the second station) of the first PRS, a second difference between the ToD (recorded at the second station) and the ToA (from the second message) of the second PRS, and the indication of whether a clock reconfiguration event occurs at the first station prior to the exchange of the first and second PRSs. In some examples, the exchange of the PRSs can be part of a V2X sidelink positioning operation, in which the PRSs are transmitted via a V2X sidelink within an ITS frequency spectrum. Moreover, the second message can be an ITS message.

Specifically, the second station may include a Kalman filter to estimate a clock error between the first station and the second station based on prior exchange of PRSs between the two stations, and to store the estimated clock error. The clock error may include a clock bias/offset between the clock sources of the first station and the second station, and clock drifts of the clock sources. If the indication does not indicate that a clock reconfiguration event occurred at the first station prior to the exchange of the first and second PRSs, the second station can perform a QCL operation of the clock error and combine the estimated clock error from the Kalman filter with the ToAs and ToDs of the first and second PRSs to determine the RTT between the first station and the second station. On the other hand, if the indication indicates that the reconfiguration event occurred at the first station prior to the exchange of the first and second PRSs, the second station can disable the QCL operation and restart the Kalman filter to generate a new estimate of clock error and the RTT based on the ToAs and ToDs of the first and second PRSs.

In addition, the first message may include other information, such as an identifier of the first station. The identifier allows the second station to identify the first station and to determine the location of the first station based on the identification. For example, the second station may have access to a database of identifiers of terrestrial stations and their known locations. The second station can then obtain the location of the first station from the database based on the identifier. The second station can then determine its location based on the locations of multiple terrestrial stations and their RTTs, as described above.

Moreover, the first message may further include transmission configuration information of the first PRS, which can aid the second station in detecting the first PRS. For example, the transmission configuration information may indicate the spectrum resource, such as the carrier frequency, used in the transmission of the first PRS. The second station can configure its wireless interface based on the transmission configuration information to demodulate received radio signals to recover the first PRS. In addition, in a case where the first PRS is transmitted on a licensed spectrum and the scheduled time of transmission of the first PRS is known, the configuration information can indicate the scheduled time of transmission of the first PRS. In such a case, the first station can transmit the first message prior to the exchange of the first PRS and the second PRS between the two stations, which enables the second station to configure its wireless interface to detect the first PRS at the scheduled time of transmission. On the other hand, in a case where the first PRS is transmitted on an unlicensed spectrum and the exact time of transmission is unknown, the first station can transmit the first message after the exchange of the first PRS and the second PRS between the two stations.

With the disclosed techniques, a wireless station on a vehicle can receive an indication of whether a clock reconfiguration event occurs at a terrestrial station, and decides whether to perform a QCL operation of prior clock error estimate or to re-estimate the clock error based on the indication. Such arrangements can reduce the likelihood of the vehicle using an outdated clock error estimate to refine the RTT measurement obtained from the PRS exchange with the terrestrial station, which in turn can improve the accuracy of the sidelink positioning operation.

In the description herein, various examples are described. For purposes of explanation, specific configurations and details are set forth to provide a thorough understanding of the embodiments. However, it will also be apparent to one skilled in the art that the embodiments may be practiced without the specific details. Furthermore, well-known features may be omitted or simplified in order not to obscure the embodiments being described.

FIG. 1 illustrates an example wireless communication 110 in which the disclosed techniques can be used. Referring to FIG. 1, wireless communications system 110 includes a UE 112; a UE 113; a UE 114; base transceiver stations (BTSs) 120, 121, 122, 123; an RSU 125; a network 130; a core network 140; and an external client 150. The core network 140 (e.g., a 5G core network (5GC)) may include back-end devices including, among other things, an Access and Mobility Management Function (AMF) 141, a Session Management Function (SMF) 142, a server 143, and a Gateway Mobile Location Center (GMLC) 144. The AMF 141, the SMF 142, the server 143, and the GMLC 144 are communicatively coupled to each other. The server 143 may be, for example, a Location Management Function (LMF) that supports positioning of the UEs 112-114 (e.g., using techniques such as Assisted Global Navigation Satellite System (A-GNSS), observed time difference of arrival (OTDOA), e.g., downlink (DL) OTDOA and/or uplink (UL) OTDOA), RTT, multi-cell RTT, real-time kinematic (RTK), precise point positioning (PPP), differential GNSS (DGNSS), enhanced cell ID (E-CID), angle of arrival (AoA), and angle of departure (AoD)).

An LMF may also be referred to as a location manager (LM), a location function (LF), a commercial LMF (CLMF), or a value-added LMF (VLMF). The server 143 (e.g., an LMF) and/or one or more other devices of the system 110 (e.g., one or more of the UEs 112-114) may be configured to determine locations of the UEs 112-114. The server 143 may communicate directly with the BTS 121 (e.g., a gNode B (gNB)) and/or one or more other BTSs, and may be integrated with the BTS 121 and/or one or more other BTSs. The SMF 142 may serve as an initial contact point of a service control function (SCF) (not shown) to create, control, and delete media sessions. The server 143 (e.g., an LMF) may be co-located or integrated with a gNB or a Transmission/Reception Point (TRP), or may be disposed remote from the gNB and/or TRP and configured to communicate directly or indirectly with the gNB and/or the TRP.

The AMF 141 may serve as a control node that processes signaling between the UEs 112-114 and the core network 140, and provides Quality of Service (QoS) flow and session management. The AMF 141 may support mobility of the UEs 112-114 including cell change and handover and may participate in supporting signaling connection to the UEs 112-114.

The system 110 is capable of wireless communication in that components of the system 110 can communicate with one another (at least sometimes using wireless connections) directly or indirectly, e.g., via the BTSs 120-123, the RSU 125, and/or the network 130 (and/or one or more other devices not shown, such as one or more other base transceiver stations). While the BTSs 120-123 are shown separately from the network 130, the network 130 may include one or more of the BTSs 120-123 and may constitute a Radio Access Network (RAN), e.g., a New Radio (NR) RAN which may also be called a Fifth-Generation (5G) Next-Generation RAN (NG-RAN). For indirect communications, the communications may be altered during transmission from one entity to another, e.g., to alter header information of data packets or to change format. The UEs 112-114 may communicate with the BTSs 120-122 via Uu interfaces, e.g., in Radio Resource Control encapsulated Long-Term Evolution (LTE) Positioning Protocol (RRC-encapsulated LPP) messages over Uu interfaces. The UEs 112-114 may also communicate with the RSU 125 via PC5 and other sidelink interfaces. The UEs 112-114 shown are a smartphone, a tablet computer, and a vehicle-based device, but these are only examples as the UEs 112-114 are not required to be any of these configurations, and other configurations of UEs may be used. The UEs 112, 113 shown are mobile wireless communication devices (although they may communicate wirelessly and via wired connections) including mobile phones (including smartphones) and a tablet computer. The UE 114 shown is a vehicle-based mobile wireless communication device (although the UE 114 may communicate wirelessly and via wired connections). In an example, the UE 114 may communicate with the RSU 125 via sidelink such as the V2X PC5 interface. Other UEs may include wearable devices (e.g., smart watches, smart jewelry, smart glasses, or smart headsets). Still other UEs may be used, whether currently existing or developed in the future. Further, other wireless devices (whether mobile or not) may be implemented within the system 110 and may communicate with each other and/or with the UEs 112-114, the BTSs 120-123, the network 130, the core network 140, and/or the external client 150. For example, such other devices may include Internet of things (IoT) devices, medical devices, home entertainment, reduced-capability UEs (e.g., NR-Light UEs), and/or automation devices. The core network 140 may communicate with the external client 150 (e.g., a computer system), e.g., to allow the external client 150 to request and/or receive location information regarding the UEs 112-114 (e.g., via the GMLC 144).

The UEs 112-114 or other devices may be configured to communicate in various networks and/or for various purposes and/or using various technologies (e.g., 5G, WiFi communication, multiple frequencies of WiFi communication, satellite positioning, one or more types of communications (e.g., Global System for Mobiles (GSM), Code Division Multiple Access (CDMA), LTE, V2X (e.g., Vehicle-to-Pedestrian (V2P), Vehicle-to-Infrastructure (V2I), Vehicle-to-Vehicle (V2V)), IEEE 802.11p, etc.). V2X communications may be cellular (Cellular-V2X (C-V2X)) and/or WiFi (e.g., Dedicated Short-Range Connection (DSRC)). The system 110 may support operation on multiple carriers (waveform signals of different frequencies). Multi-carrier transmitters can transmit modulated signals simultaneously on the multiple carriers. Each modulated signal may be a CDMA signal, a Time Division Multiple Access (TDMA) signal, an Orthogonal Frequency Division Multiple Access (OFDMA) signal, a Single-Carrier Frequency Division Multiple Access (SC-FDMA) signal, etc. Each modulated signal may be sent on a different carrier and may carry pilot, overhead information, data, etc.

The BTSs 120-123 and the RSU 125 may wirelessly communicate with the UEs 112-114 in the system 110 via one or more antennas. A BTS may also be referred to as a BS, an access point, a gNB, an access node (AN), a Node B, an evolved Node B (eNB), etc. For example, each of the BTSs 120, 121 may be a gNB or a transmission point gNB, the BTS 122 may be a macro cell (e.g., a high-power cellular BS) and/or a small cell (e.g., a low-power cellular BS), and the BTS 123 may be an access point (e.g., a short-range BS configured to communicate with short-range technology such as WiFi, WiFi-Direct (WiFi-D), Bluetooth®, Bluetooth®-low energy (BLE), Zigbee). One or more of the BTSs 120-123 may be configured to communicate with the UEs 112-114 via multiple carriers. The BTSs 120-123 may be configured as an RSU 125. Each of the BTSs 120, 121 may provide communication coverage for a respective geographic region, e.g., a cell. Each cell may be partitioned into multiple sectors as a function of the BS antennas.

The BTSs 120-123 each comprise one or more TRPs. For example, each sector within a cell of a BTS may comprise a TRP, although multiple TRPs may share one or more components (e.g., share a processor but have separate antennas). The system 110 may include only macro TRPs or the system 110 may have TRPs of different types, e.g., macro, pico, and/or femto TRPs. A macro TRP may cover a relatively large geographic area (e.g., several kilometers in radius) and may allow unrestricted access by terminals with service subscriptions. A pico TRP may cover a relatively small geographic area (e.g., a pico cell) and may allow unrestricted access by terminals with service subscriptions. A femto or home TRP may cover a relatively small geographic area (e.g., a femto cell) and may allow restricted access by terminals having association with the femto cell (e.g., terminals for users in a home).

The UEs 112-114 may be referred to as terminals, access terminals (ATs), mobile stations, mobile devices, subscriber units, etc. The UEs 112-114 may include various devices as listed above and/or other devices. The UEs 112-114 may be configured to connect indirectly to one or more communication networks via one or more device-to-device (D2D) peer-to-peer (P2P) links. The D2D P2P links may be supported with any appropriate D2D radio access technology (RAT), such as LTE Direct (LTE-D), WiFi-D, Bluetooth®, and so on. One or more of a group of the UEs 112-114 utilizing D2D communications may be within a geographic coverage area of a TRP, such as one or more of the BTSs 120-123. Other UEs in such a group may be outside such geographic coverage areas or be otherwise unable to receive transmissions from a BS. Groups of the UEs 112-114 communicating via D2D communications may utilize a one-to-many (1:M) system in which each UE may transmit to other UEs in the group. A TRP of the BTSs 120-123 may facilitate scheduling of resources for D2D communications. In other cases, D2D communications may be carried out between UEs without the involvement of a TRP. For example, the UE 114 may communicate with RSU 125 via sidelinks in licensed and/or unlicensed spectrum.

Figure 2:
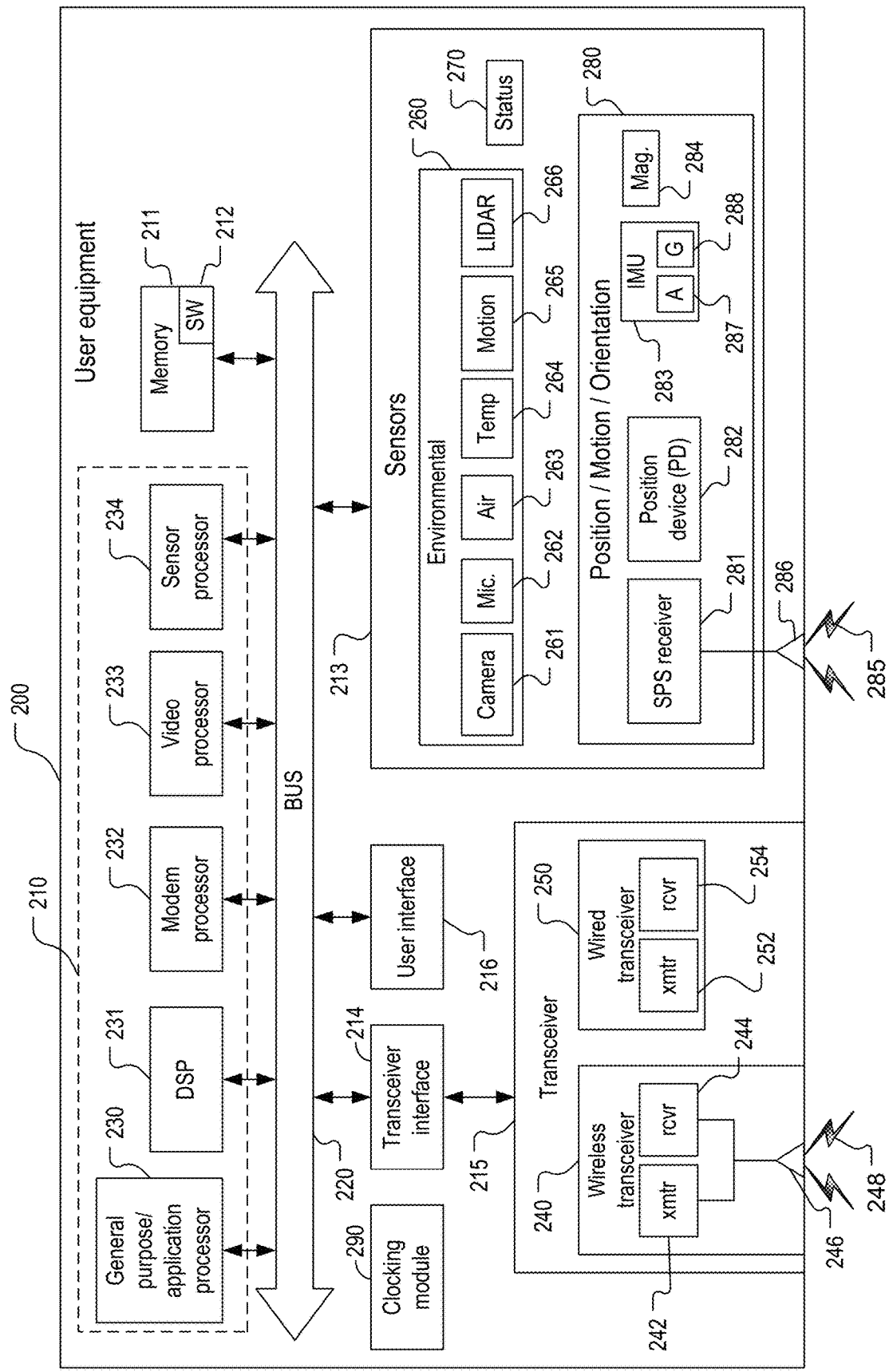
FIG. 2 is a block diagram of components of an example of a user equipment (UE).

FIG. 2 illustrates an example of a UE 200, which can implement UEs 112-114 of FIG. 1. Referring to FIG. 2, UE 200 comprises a computing platform including a processor 210, memory 211 including software (SW) 212, one or more sensors 213, a transceiver interface 214 for a transceiver 215, and a user interface 216. The processor 210, the memory 211, the sensor(s) 213, the transceiver interface 214, and the user interface 216 may be communicatively coupled to each other by a bus 220 (which may be configured, e.g., for optical and/or electrical communication). One or more of the components shown (e.g., one or more of the sensors 213) may be omitted from the UE 200.

The processor 210 may include one or more intelligent hardware devices, e.g., a central processing unit (CPU), a microcontroller, or an application-specific integrated circuit (ASIC). The processor 210 may comprise multiple processors including a general-purpose/application processor 230, a digital signal processor (DSP) 231, a modem processor 232, a video processor 233, and/or a sensor processor 234. One or more of the processors 230-234 may comprise multiple devices (e.g., multiple processors). For example, the sensor processor 234 may comprise, e.g., processors for radar, ultrasound, and/or LIDAR. The modem processor 232 may support dual Subscriber Identity Module or Subscriber Identification Module (SIM)/dual connectivity (or even more SIMs). For example, a SIM may be used by an original equipment manufacturer (OEM), and another SIM may be used by an end user of the UE 200 for connectivity. The memory 211 is a non-transitory storage medium that may include random access memory (RAM), flash memory, disc memory, and/or read-only memory (ROM), etc. The memory 211 stores the SW 212 which may be processor-readable, processor-executable software code containing instructions that are configured to, when executed, cause the processor 210 to perform various functions described herein. Alternatively, the SW 212 may not be directly executable by the processor 210 but may be configured to cause the processor 210, e.g., when compiled and executed, to perform the functions. The description may refer only to the processor 210 performing a function, but this includes other implementations such as where the processor 210 executes software and/or firmware. The description may refer to the processor 210 performing a function as shorthand for one or more of the processors 230-234 performing the function. The description may refer to the UE 200 performing a function as shorthand for one or more appropriate components of the UE 200 performing the function. The processor 210 may include a memory with stored instructions in addition to and/or instead of the memory 211. Functionality of the processor 210 is discussed more fully below.

The configuration of the UE 200 shown in FIG. 2 is an example and not limiting of the invention, including the claims, and other configurations may be used. For example, an example configuration of the UE includes one or more of the processors 230-234 of the processor 210, the memory 211, and the wireless transceiver 240. Other example configurations include one or more of the processors 230-234 of the processor 210, the memory 211, the wireless transceiver 240, and one or more of the sensors 213, the user interface 216, and/or the wired transceiver 250.

The UE 200 may comprise the modem processor 232 that may be capable of performing baseband processing of signals received and down-converted by the transceiver 215 and/or the satellite position system (SPS) receiver 281 (discussed below). The modem processor 232 may perform baseband processing of signals to be up-converted for transmission by the transceiver 215. Also or alternatively, baseband processing may be performed by the processor 230 and/or the DSP 231. Other configurations, however, may be used to perform baseband processing.

The UE 200 includes the sensors 213 that may include one or more of various types of sensors, for example, an environmental sensor 260, a status sensor 270, and a position/motion/orientation (PMO) sensor 280. The PMO sensor 280 may include one or more sensors from which position and/or motion and/or orientation of the UE 200 may be determined. While each of the sensors 260, 270, 280 may be referred to in the singular, each of the sensors 260, 270, 280 may include more than one sensor, examples of some of which are discussed explicitly herein. The sensors 213 may generate analog and/or digital signal indications of which may be stored in the memory 211 and processed by the processor 210 (e.g., the processor 230, the DSP 231, the video processor 233, and/or the sensor processor 234 as appropriate) in support of one or more applications such as, for example, applications directed to positioning, navigation, and/or resource management. The description herein may refer to the processor 210 generally as performing one or more functions that one or more of the processors 230-234 perform.

The sensor(s) 213 may be used in resource management, relative location measurements, relative location determination, motion determination, etc. Information detected by the sensor(s) 213 may be used to determine how to allocate resources of the UE 200, e.g., transmission power, processing power for transmission and/or reception of communication signals, transmission and/or reception directionality. The plural term "resources" is often used throughout the discussion here, but this term includes the singular as well, i.e., a single resource, e.g., being allocated. Also or alternatively, information detected by the sensor(s) may be used for motion detection, relative displacement, dead reckoning, sensor-based location determination, and/or sensor-assisted location determination. The sensor(s) 213 may be useful to determine whether the UE 200 is fixed (stationary) or mobile and/or whether to report certain useful information to the server 120 regarding the mobility of the UE 200. For example, based on the information obtained/measured by the sensor(s) 213, the UE 200 may notify/report to the server 120 that the UE 200 has detected movements or that the UE 200 has moved, and report the relative displacement/distance (e.g., via dead reckoning, or sensor-based location determination, or sensor-assisted location determination enabled by the sensor(s) 213). In another example, for relative positioning information, the sensors/inertial measurement unit (IMU) can be used to determine the angle and/or orientation of the other device with respect to the UE 200, etc. The position and/or motion of the UE 200 may be used in determining resource allocation for communication, e.g., between vehicles or between a vehicle and an RSU. The UE 200 may, for example, be disposed in or integrated with a vehicle. For example, the UE 200 may be the UE 114 that is a vehicle, in the example shown in FIG. 1, a car, although other forms of vehicles may be used, e.g., trucks or aerial UEs such as drones. As such, the UE 200 may be configured for various forms of communication, e.g., V2V, V2X (vehicle-to-everything), cellular V2X (CV2X), cellular V2V (CV2V).

The environmental sensor 260 may include one or more sensors for measuring one or more internal and/or external environmental conditions. In this example, the environmental sensor 260 includes a camera 261, a microphone 262, an air-flow sensor 263, a temperature sensor 264, a motion sensor 265, and a LIDAR (Light Detection and Ranging) sensor 266. While each of the sensors 261-266 may be referred to in the singular, each of the sensors 261-266 may include more than one sensor, examples of some of which are discussed explicitly herein. For example, the camera 261 may include at least one camera configured (e.g., designed, made, disposed, and directed) to capture images external to the UE 200 and/or may include one or more cameras configured to capture images internal to the UE 200 (e.g., in a passenger compartment of a vehicle). As other examples, the microphone 262, the temperature sensor 264, and/or the motion sensor 265 may include multiple microphones, multiple thermometers, and/or multiple motion detectors configured to detect sound, temperature, and/or motion (respectively) outside and/or inside of the vehicle. Indeed, any of the sensors 261-265 may include multiple respective sensors outside the vehicle and/or multiple respective sensors inside the vehicle for making respective measurements at multiple locations about the vehicle and/or in different directions relative to the vehicle. The sensors 261-265 are examples and one or more of the sensors 261-265 may be omitted from the UE 200 and/or one or more other sensors may be included in the UE 200. For example, the environmental sensor 260 may include one or more barometric pressure sensors and/or one or more ambient light sensors and/or one or more other sensors.

The camera 261 may be configured for capturing still and/or moving imagery. For example, each camera of the camera 261 may comprise, for example, an imaging sensor (e.g., a charge coupled device or a complementary metal-oxide-semiconductor (CMOS) imager), a lens, analog-to-digital circuitry, or frame buffers. Additional processing, conditioning, encoding, and/or compression of signals representing captured images may be performed by the general-purpose processor 230 and/or the DSP 231. Also or alternatively, the video processor 233 may perform conditioning, encoding, compression, and/or manipulation of signals representing captured images. The video processor 233 may decode/decompress stored image data for presentation on a display device (not shown), e.g., of the user interface 216.

The motion detector 265 is configured to detect motion using known techniques. For example, the motion detector 265 may send and receive soundwaves (e.g., ultrasound signals) and analyze the received signals for Doppler effects indicative of motion. Use of multiple motion detectors may help identify the relative location (e.g., direction relative to the UE 200) of an object.

The LIDAR sensor 266 is configured to determine range to an object, which may be used by the processor 210 to detect the presence of an object. Use of multiple LIDAR sensors may help identify the relative location (e.g., direction relative to the UE 200) of an object. The LIDAR sensor 266 may be called a laser radar (LADAR) sensor, as is common when using a LIDAR sensor for detecting relatively small objects such as vehicles or other artificial (human-made) objects.

The status sensor 270 is configured to provide one or more indications of one or more vehicle conditions of the vehicle associated with the UE 200. For example, vehicle conditions may include a gear status of the vehicle (e.g., whether the vehicle is in park, drive, or neutral, or in which gear the vehicle is presently). Another vehicle condition may be whether an emergency brake is engaged. Another vehicle condition may be whether a main brake is presently engaged and possibly engaged to what degree. Another vehicle condition may be whether an accelerator is presently engaged and possibly to what degree. Another vehicle condition may be the status of the steering wheel (e.g., turned which way and how much). Other example vehicle conditions may include whether a right-turn indicator is actuated, whether a left-turn indicator is actuated, and/or whether hazard lights (also called "four ways" or emergency flashers, etc.) are actuated. Another example vehicle condition may include tire status (e.g., tire pressure, rate of tire pressure change (e.g., to indicate a flat or blowout)). Another example vehicle condition is speed as registered by a speedometer of the vehicle. These vehicle conditions are examples, and one or more other sensors may be provided to sense one or more other vehicle conditions.

The PMO sensor 280 may include one or more sensors for providing one or more vehicle conditions. For example, the PMO sensor 280 may include one or more sensors for measuring information from which position and/or motion and/or orientation of the UE 200 may be determined and possibly determining position and/or motion and/or orientation of the UE 200. In this example, the PMO sensor 280 includes an SPS receiver 281, a position device (PD) 282, an IMU 283, and a magnetometer 284. The components of the PMO sensor 280 shown are examples, and one or more of these components may be omitted and/or one or more other components included in the PMO sensor 280. Also, while each of the components 281-284 of the PMO sensor 280 may be referred to in the singular, each of the components 281-284 may include more than one such component, examples of some of which are discussed explicitly herein. Also, the PD 282 may be part of the SPS receiver 281 and/or the IMU 283 and/or part of the processor 210, and may not be a sensor itself (e.g., may not take measurements), but may process information from one or more of the sensors 281, 283, 284 and/or one or more other sensors.

The IMU 283 may comprise one or more inertial sensors, for example, an accelerometer 287 (e.g., responding to acceleration of the UE 200 in three dimensions) and/or a gyroscope 288. While each of the sensors 287, 288 may be referred to in the singular, each of the sensors 287, 288 may include more than one sensor. The IMU 283 may be configured to provide measurements about a direction of motion and/or a speed of motion of the UE 200, which may be used, for example, in relative location determination. For example, the accelerometer 287 and/or the gyroscope 288 of the IMU 283 may detect, respectively, a linear acceleration and a speed of rotation of the UE 200. The linear acceleration and speed of rotation measurements of the UE 200 may be integrated over time (e.g., by the IMU 283 and/or the PD 282) to determine an instantaneous direction of motion as well as a displacement of the UE 200. The instantaneous direction of motion and the displacement may be integrated to track a location of the UE 200. For example, a reference location of the UE 200 may be determined, e.g., using the SPS receiver 281 (and/or by some other means) for a moment in time, and measurements from the accelerometer 287 and the gyroscope 288 taken after this moment in time may be used in dead reckoning to determine a present location of the UE 200 based on movement (direction and distance) of the UE 200 relative to the reference location.

The magnetometer 284 may determine magnetic field strengths in different directions, which may be used to determine orientation of the UE 200, which may be used, for example, to provide a digital compass for the UE 200. The magnetometer 284 may include a two-dimensional magnetometer configured to detect and provide indications of magnetic field strength in two orthogonal dimensions. Also or alternatively, the magnetometer 284 may include a three-dimensional magnetometer configured to detect and provide indications of magnetic field strength in three orthogonal dimensions. The magnetometer 284 may provide means for sensing a magnetic field and providing indications of the magnetic field, e.g., to the processor 210. The magnetometer 284 may provide measurements to determine orientation (e.g., relative to magnetic north and/or true north) that may be used for any of a variety of purposes, e.g., to support one or more compass applications.

The SPS receiver 281 (e.g., a GPS receiver or other GNSS receiver) may be capable of receiving and acquiring SPS signals 285 via an SPS antenna 286. The antenna 286 is configured to transduce the wireless signals 285 to wired signals, e.g., electrical or optical signals, and may be integrated with the antenna 246. The SPS receiver 281 may be configured to process, in whole or in part, the acquired SPS signals 285 for estimating a location of the UE 200. For example, the SPS receiver 281 may be configured to determine a location of the UE 200 by trilateration using the SPS signals 285. The general-purpose processor 230, the memory 211, the DSP 231, and/or one or more specialized processors (not shown) may be utilized to process acquired SPS signals, in whole or in part, and/or to calculate an estimated location of the UE 200, in conjunction with the SPS receiver 281. The memory 211 may store indications (e.g., measurements) of the SPS signals 285 and/or other signals (e.g., signals acquired from the wireless transceiver 240) for use in performing positioning operations. The general-purpose processor 230, the DSP 231, and/or one or more specialized processors, and/or the memory 211 may provide or support a location engine for use in processing measurements to estimate a location of the UE 200. Also or alternatively, some or all of the position determination signal processing may be performed by the PD 282.

The PD 282 may be configured to determine a position of the UE 200 (including absolute and/or relative position of the UE 200), motion of the UE 200, and/or time. For example, the PD 282 may communicate with, and/or include some or all of, the SPS receiver 281. The PD 282 may use measurements from the SPS receiver 281 and/or the IMU 283 and/or the magnetometer 284 to determine position and/or motion of the UE 200, e.g., using trilateration or dead reckoning. The PD 282 may work in conjunction with the processor 210 and the memory 211 as appropriate to perform at least a portion of one or more positioning methods (to determine location of the UE 200), although the description herein may refer only to the PD 282 being configured to perform, or performing, in accordance with the positioning method(s). The PD 282 may also or alternatively be configured to determine a location of the UE 200 using terrestrial-based signals (e.g., at least some of signals 248 discussed below) for trilateration, for assistance with obtaining and using the SPS signals 285, or both. The PD 282 may be configured to use one or more other techniques (e.g., relying on the UE's self-reported location (e.g., part of the UE's position beacon)) for determining the location of the UE 200, and may use a combination of techniques (e.g., SPS and terrestrial positioning signals) to determine the location of the UE 200. The PD 282 may be configured to provide indications of uncertainty and/or error in the determined position and/or motion.

The transceiver 215 may include a wireless transceiver 240 and/or a wired transceiver 250 configured to communicate with other devices through wireless connections and wired connections, respectively. For example, the wireless transceiver 240 may include a transmitter 242 and receiver 244 coupled to one or more antennas 246 for transmitting (e.g., on one or more uplink channels) and/or receiving (e.g., on one or more downlink channels) wireless signals 248 and transducing signals from the wireless signals 248 to wired (e.g., electrical and/or optical) signals and from wired signals to the wireless signals 248. The wireless transceiver 240 may be configured for wireless communication to send communications to, and receive communications from, a variety of entities such as other UEs or BSs. Thus, the transmitter 242 may include multiple transmitters that may be discrete components or combined/integrated components, and/or the receiver 244 may include multiple receivers that may be discrete components or combined/integrated components. The wireless transceiver 240 may be configured to communicate signals (e.g., with TRPs and/or one or more other devices) according to a variety of RATs, such as 5G NR, GSM, Universal Mobile Telecommunications System (UMTS), Advanced Mobile Phone System (AMPS), CDMA, Wideband CDMA (WCDMA), LTE, LTE-D, 3GPP LTE-V2X (PC5), IEEE 802.11 (including IEEE 802.11p), WiFi, WiFi-D, Bluetooth®, or Zigbee. NR may use mm-wave frequencies and/or sub-6 GHz frequencies. The wired transceiver 250 may include a transmitter 252 and a receiver 254 configured for wired communication, e.g., with the network 130, to send communications to, and receive communications from, a gNB, for example. The transmitter 252 may include multiple transmitters that may be discrete components or combined/integrated components, and/or the receiver 254 may include multiple receivers that may be discrete components or combined/integrated components. The wired transceiver 250 may be configured, e.g., for optical communication and/or electrical communication. The transceiver 215 may be communicatively coupled to the transceiver interface 214, e.g., by optical and/or electrical connection. The transceiver interface 214 may be at least partially integrated with the transceiver 215.

The user interface 216 may comprise one or more of several devices such as, for example, a speaker, microphone, display device, vibration device, keyboard, or touch screen. The user interface 216 may include more than one of any of these devices. The user interface 216 may be configured to enable a user to interact with one or more applications hosted by the UE 200. For example, the user interface 216 may store indications of analog and/or digital signals in the memory 211 to be processed by DSP 231 and/or the general-purpose processor 230 in response to action from a user. Similarly, applications hosted on the UE 200 may store indications of analog and/or digital signals in the memory 211 to present an output signal to a user. The user interface 216 may include an audio input/output (I/O) device comprising, for example, a speaker, a microphone, digital-to-analog circuitry, analog-to-digital circuitry, an amplifier, and/or gain control circuitry (including more than one of any of these devices). Other configurations of an audio I/O device may be used. Also or alternatively, the user interface 216 may comprise one or more touch sensors responsive to touching and/or pressure, e.g., on a keyboard and/or touch screen of the user interface 216.

UE 200 further includes a clocking module 290. Clocking module 290 can supply one or more clock signals to various components of UE 200, including, for example, processor 210, sensors 213, transceiver interface 214, transceiver 215, and user interface 216, to control the timing of operations of those components. Clocking module 290 can also maintain a local clock source. The local clock source can provide time measurements of various events, such as transmission and reception of certain wireless signals. As to be described below, the time measurements can support a V2X-sidekick positioning operation.

Figure 3:
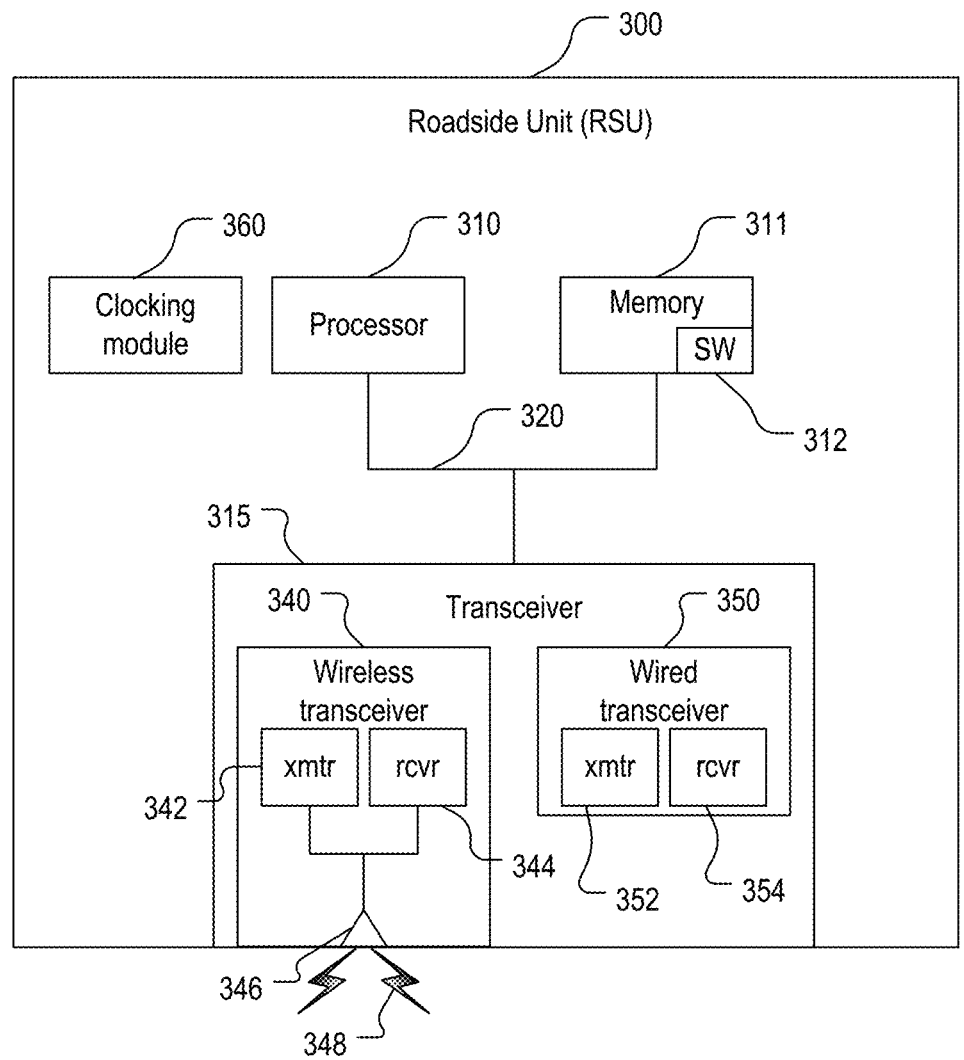
FIG. 3 is a block diagram of components of an example roadside unit (RSU).

FIG. 3 illustrates an example of an RSU 300, which can implement RSU 125 of FIG. 1. Referring to FIG. 3, RSU 300 comprises a computing platform including a processor 310, memory 311 including SW 312, and a transceiver 315. The processor 310, the memory 311, and the transceiver 315 may be communicatively coupled to each other by a bus 320 (which may be configured, e.g., for optical and/or electrical communication). One or more of the shown apparatus (e.g., a wired interface) may be omitted from the RSU 300. The processor 310 may include one or more intelligent hardware devices, e.g., a CPU, a microcontroller, or an ASIC. The processor 310 may comprise multiple processors The memory 311 is a non-transitory storage medium that may include RAM, flash memory, disc memory, and/or ROM, etc. The memory 311 stores the SW 312, which may be processor-readable, processor-executable software code containing instructions that are configured to, when executed, cause the processor 310 to perform various functions described herein. Alternatively, the SW 312 may not be directly executable by the processor 310 but may be configured to cause the processor 310, e.g., when compiled and executed, to perform the functions. The description may refer only to the processor 310 performing a function, but this includes other implementations such as where the processor 310 executes software and/or firmware. The description may refer to the processor 310 performing a function as shorthand for one or more of the processors contained in the processor 310 performing the function. The description may refer to the RSU 300 performing a function as shorthand for one or more appropriate components of the RSU 300 (and thus of one of the BTSs 120-123) performing the function. The processor 310 may include a memory with stored instructions in addition to and/or instead of the memory 311. Functionality of the processor 310 is discussed more fully below.

The transceiver 315 may include a wireless transceiver 340 and a wired transceiver 350 configured to communicate with other devices through wireless connections and wired connections, respectively. For example, the wireless transceiver 340 may include a transmitter 342 and receiver 344 coupled to one or more antennas 346 for transmitting (e.g., on one or more uplink or sidelink channels) and/or receiving (e.g., on one or more downlink or sidelink channels) wireless signals 348 and transducing signals from the wireless signals 348 to wired (e.g., electrical and/or optical) signals and from wired (e.g., electrical and/or optical) signals to the wireless signals 348. Thus, the transmitter 342 may include multiple transmitters that may be discrete components or combined/integrated components, and/or the receiver 344 may include multiple receivers that may be discrete components or combined/integrated components. The wireless transceiver 340 may be configured to communicate signals (e.g., with the UE 200, one or more other UEs, and/or one or more other devices) according to a variety of RATs), such as 5G NR, GSM, UMTS, AMPS, CDMA, WCDMA, LTE, LTE-D, 3GPP LTE-V2X (PC5), IEEE 802.11 (including IEEE 802.11p), WiFi, WiFi-D, Bluetooth®, or Zigbee. The wired transceiver 350 may include a transmitter 352 and a receiver 354 configured for wired communication, e.g., with the network 130 to send communications to, and receive communications from, the server 143, for example. The transmitter 352 may include multiple transmitters that may be discrete components or combined/integrated components, and/or the receiver 354 may include multiple receivers that may be discrete components or combined/integrated components. The wired transceiver 350 may be configured, e.g., for optical communication and/or electrical communication.

RSU 300 further includes a clocking module 360. Clocking module 360 can supply one or more clock signals to various components of RSU 300, including, for example, processor 310 and transceiver 315, to control the timing of operations of those components. Clocking module 360 can also maintain a local clock source. The local clock source can provide time measurements of various events, such as transmission and reception of certain wireless signals. As to be described below, the time measurements can support a V2X-sidekick positioning operation.

The configuration of the RSU 300 shown in FIG. 3 is an example and not limiting of the invention, including the claims, and other configurations may be used. For example, the description herein discusses that the RSU 300 is configured to perform or performs several functions, but one or more of these functions may be performed by the server 143 and/or the UE 200 (i.e., the server 143 and/or the UE 200 may be configured to perform one or more of these functions).

Figure 4A:
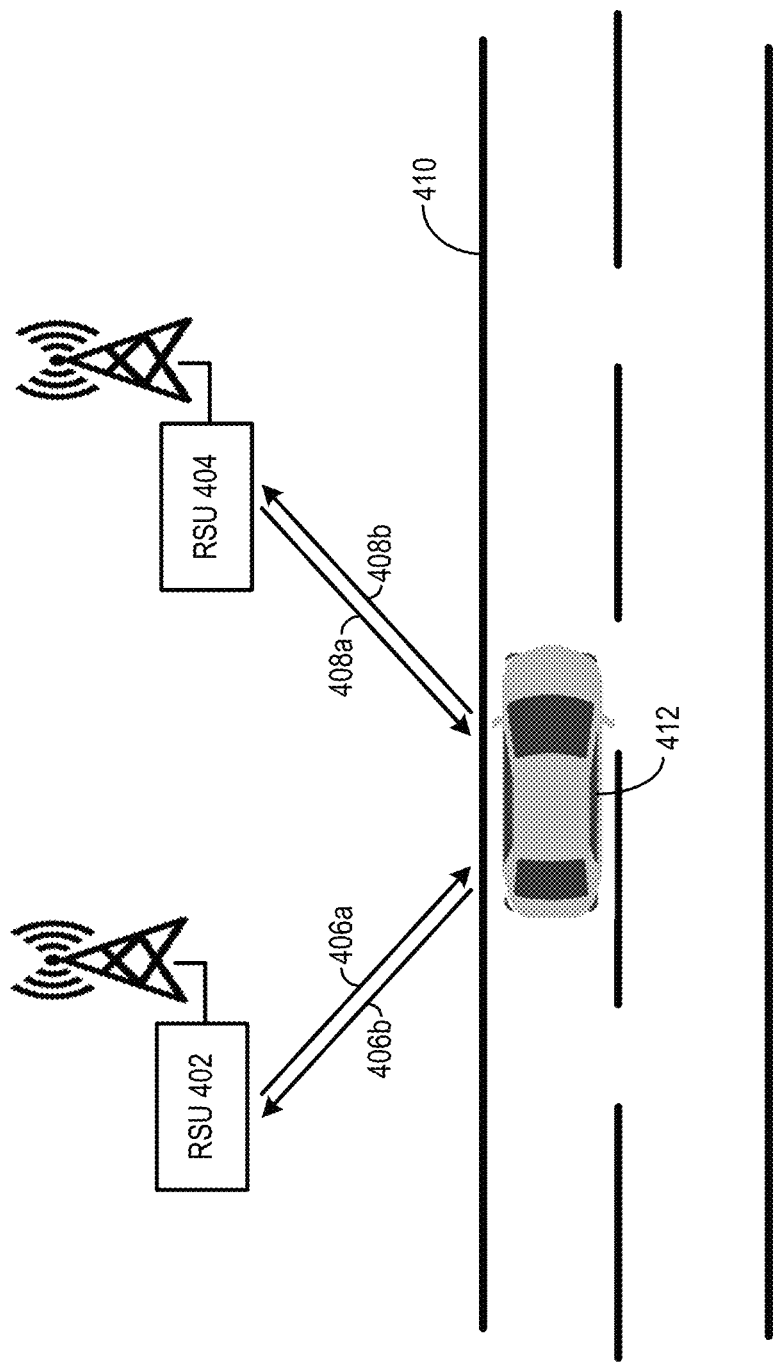
FIG. 4A and FIG. 4B illustrate examples of a positioning operation that can be performed between the example UE of FIG. 2 and the example RSU of FIG. 3.
Figure 4B:
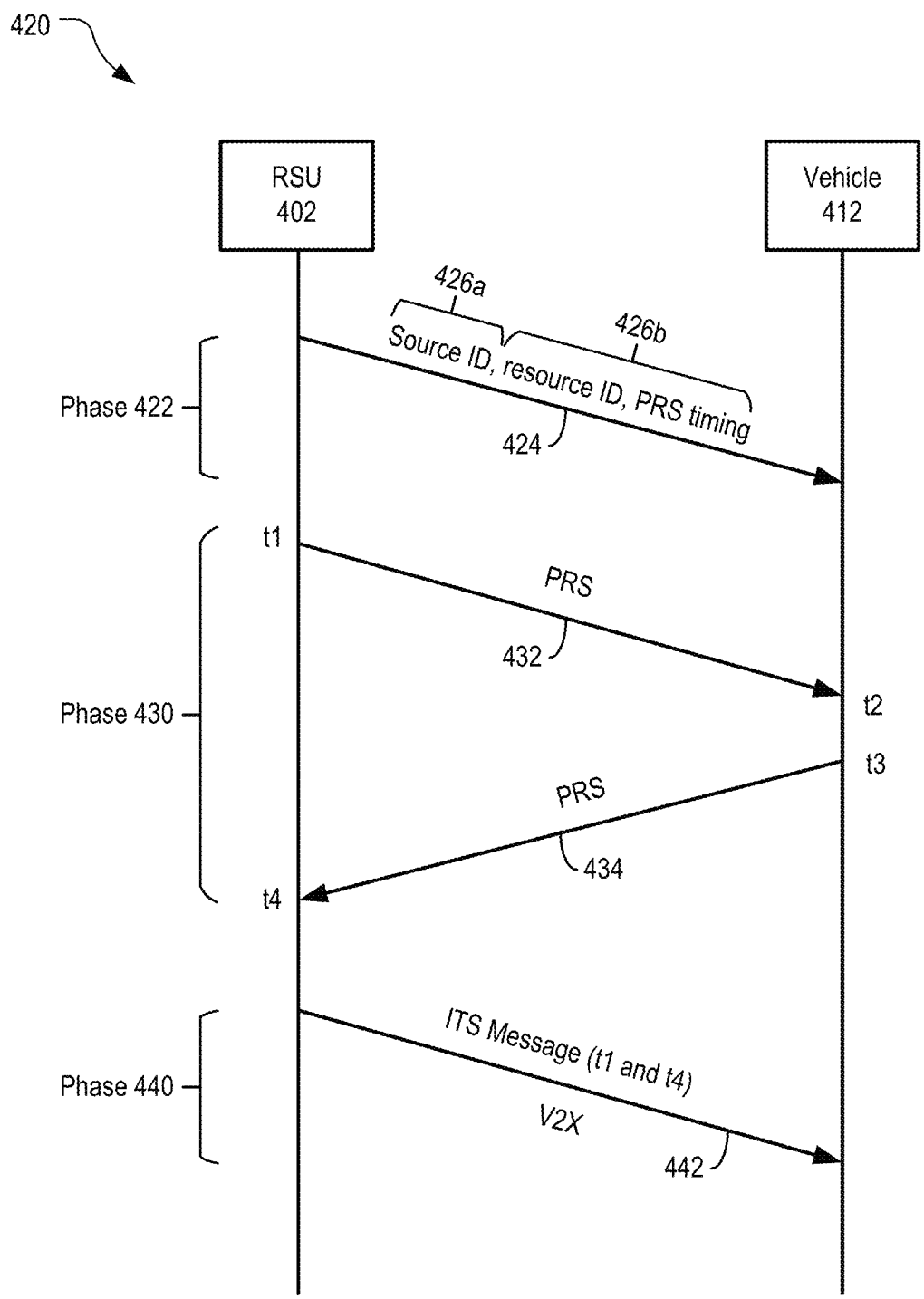

FIG. 4A and FIG. 4B illustrate examples of a positioning operation that can be performed between UE 200 and RSU 300. As shown in FIG. 4A, multiple RSUs, including RSUs 402 and 404, can be disposed along a road 410. Each of RSUs 402 and 404 can include RSU 300 of FIG. 3. RSUs 402 and 404 may be configured in a traffic light, for example, or other roadside fixture such as a lamp post, or road sign. Each of RSUs 402 and 404 may exchange PRSs, including PRSs 406a and 406b for RSU 402 and PRSs 408a and 408b for RSU 404, with a vehicle 412 on road 410, which can include UE 200. Based on the exchanged PRSs, vehicle 412 can determine the RTT and time offset of the PRSs between RSUs 402 and 404. With the locations of RSUs 402 and 404 known, and based on the time offset of the PRSs between RSUs 402 and 404, vehicle 412 can determine its location based on, for example, an OTDOA operation.

FIG. 4B illustrates an example of a message flow 420 between an RSU (e.g., RSU 402) and a vehicle (e.g., vehicle 412) to support the example positioning operation of FIG. 4A. As shown in FIG. 4B, in a phase 422 of the positioning operation, RSU 402 may transmit a message 424 including an identifier 426a and transmission configuration information 426b. Identifier 426a may include an identifier, such as a source identifier (source ID), of RSU 402, which can be used by vehicle 412 to identify RSU 402, and to determine the location of the first station based on the identification. For example, vehicle 412 may have access to a database of identifiers of a set of terrestrial stations, including RSUs 402 and 404, and their known locations. Vehicle 412 can then obtain the location of the RSU 402 from the database based on the identifier for the OTDOA operation. In addition, transmission configuration information 426b can aid vehicle 412 in detecting PRSs from RSU 402. For example, the configuration information may indicate the spectrum resource, such as the carrier frequency, used in the transmission of PRSs by the RSU. Vehicle 412 can then configure its wireless interface based on the transmission configuration information to demodulate the received radio signals to recover the PRSs. In addition, in a case where the RSU transmits PRSs on a licensed spectrum and the scheduled time of transmission of the PRSs by the RSU is known, the transmission configuration information can indicate the scheduled time of transmission of the PRSs.

In a phase 430 of the positioning operation, RSU 402 and vehicle 412 can exchange PRSs. Specifically, RSU 402 can transmit a PRS 432 to vehicle 412. RSU 402 can record the ToD of PRS 432 at time t1 based on its local clock source provided by clocking module 360 of FIG. 3, whereas vehicle 412 can record the ToA of PRS 402 at time t2 based on its local clock source provided by clocking module 290 of FIG. 2. Moreover, vehicle 412 can transmit a PRS 434 to RSU 402. Vehicle 412 can record the ToD of PRS 434 at time t3 based on its local clock source provided by clocking module 290 of FIG. 2, whereas RSU 402 can record the ToA of PRS 434 at time t4 based on its local clock source provided by clocking module 360 of FIG. 3.

In a phase 440 of the positioning operation, RSU 402 can provide information including the times t1 and t4 to vehicle 412 in a message, such as an ITS message 442 in a V2X implementation. Based on the recorded times t1 and t4, vehicle 412 can compute the RTT between vehicle 412 and RSU 402 based on the following equation:

$$\text{RTT}_{RSU\text{-}402} = (t4 - t3) + (t2 - t1) \qquad \text{(Equation 1)}$$

Vehicle 412 can repeat positioning operation 420 with other RSUs, such as RSU 404, and obtain other RTT measurements with the other RSUs. Vehicle 412 can then estimate a time offset in the PRSs between RSUs 402 and 404 to vehicle 412 based on the RTT difference. Based on the time offset and the known locations of RSUs 402 and 404, vehicle 412 can estimate its location based on the following equation:

$$\Delta T = \sqrt{(x_{veh} - x_{402})^2 + (y_{veh} - y_{402})^2}/c - \sqrt{(x_{veh} - x_{404})^2 + (y_{veh} - y_{404})^2}/c \qquad \text{(Equation 2)}$$

In Equations 1 and 2, $\Delta T$ represents the time offset computed based on the RTT difference between RSUs 402 and 404, $x_{veh}$ and $y_{veh}$ represent the coordinates of vehicle 412 to be determined, $x_{402}$ and $y_{402}$ represent the known coordinates of RSU 402, and $x_{404}$ and $y_{404}$ represent the known coordinates of RSU 404, whereas c represents speed of light. Equation 2 assumes that PRSs 432 and 434 propagate via a direct line-of-sight path between vehicle 412 and RSU 402 (and RSU 404), such that the direct distance between the vehicle and the RSU is represented by the ToF of the PRS (e.g., t4–t3 and t2–t1 in equation 1).

In FIG. 4B, phase 422 of the positioning operation, in which RSU 402 transmits identifier 426a and transmission configuration information 426b, can occur before phase 424 in which RSU 402 and vehicle 412 exchange PRSs. Such arrangements can be provided in a case where the RSU transmits PRSs on a licensed spectrum and the scheduled time of transmission of the PRSs by the RSU is known, and transmission configuration information 426b indicates the scheduled time of transmission of the PRSs. On the other hand, in a case where the PRSs are transmitted on an unlicensed spectrum and the exact time of transmission is not known, the RSU can transmit message 424 after the exchange of PRSs 432 and 434, and phase 422 can be performed after phase 430. For example, in a V2X implementation, the RSU may be configured to broadcast PRS 432 on unlicensed spectrum via a sidelink based on a D2D protocol such as PC5. Other messaging protocols and spectrum may be used. Vehicle 412 may then transmit PRS 434 using the same interface. The ToA information for the PRS transmissions may then be exchanged using ITS messaging in the V2X spectrum.

Figure 5A:
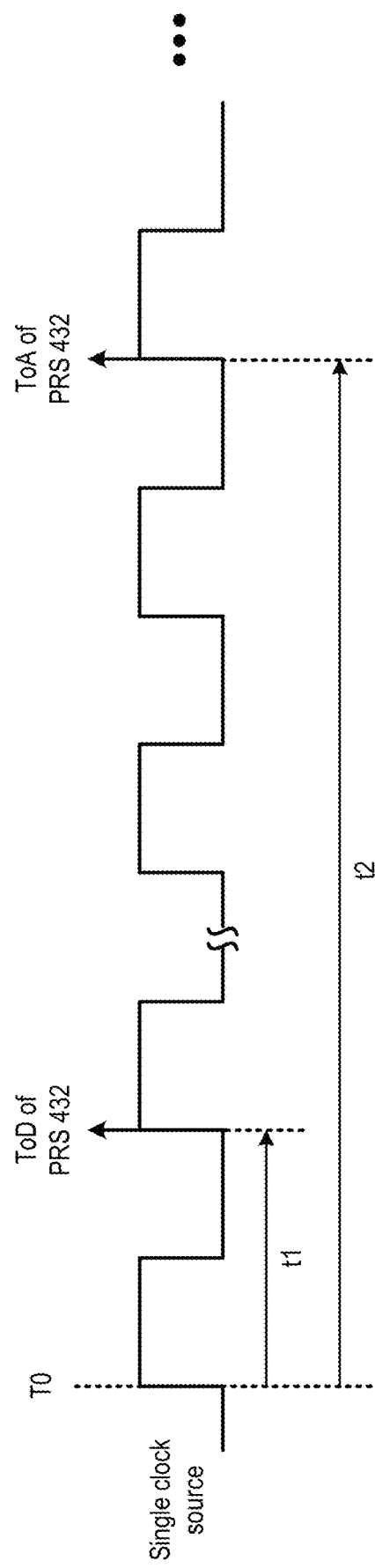
FIG. 5A, FIG. 5B, FIG. 5C, FIG. 5D, and FIG. 5E illustrate example techniques to mitigate the effect of clock error on positioning operations.
Figure 5B:
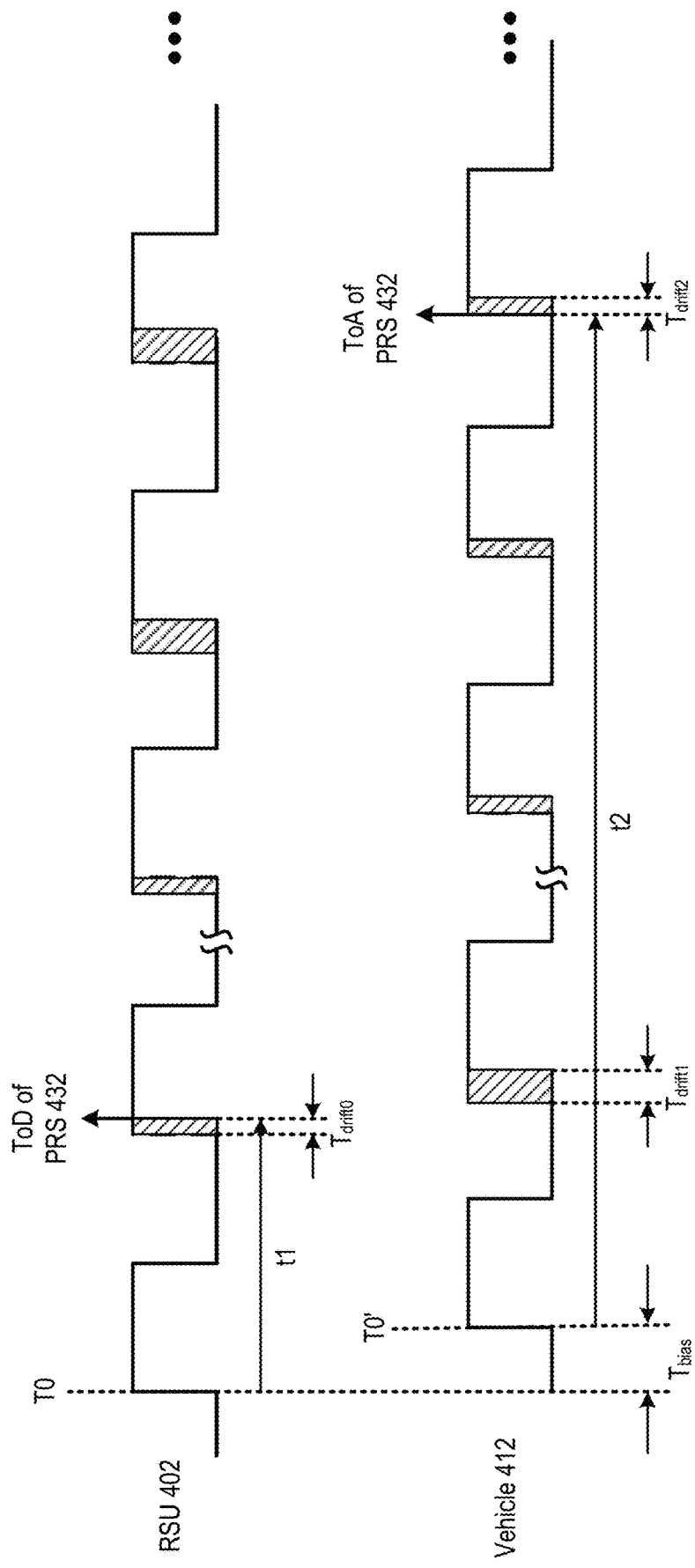

The accuracy of the RTT measurements, as well as the accuracy of the position estimation of the vehicle, can be degraded by a clock error/difference between the vehicle and the terrestrial station. FIG. 5A and FIG. 5B illustrate effects of clock error on RTT measurement. Specifically, referring to FIG. 5A, the ToD recorded for PRS 432 and the ToA recorded for PRS 432 truly represent the ToF between the vehicle and RSU 402 only if both the ToA and ToD are measured using the same clock source. In FIG. 5A, the ToD has a timestamp of t1 from a reference time T0, whereas the ToA has a timestamp of t2 from the same reference time T0. As both the ToD and ToA are measured with respect to the same reference time, the difference between the ToD and the ToA can represent the time spent by PRS 432 as the signal travels from RSU 402 to vehicle 412.

On the other hand, RSU 402 and vehicle 412 have two different clock sources (e.g., clocking module 290 of FIG. 2 and clocking module 360 of FIG. 3), and the two clock sources are not necessarily synchronized with each other. As a result, there exists a static clock bias/offset ($T_{bias}$) between the clock of RSU 402 between reference time T0 of RSU 402 and reference time T0' of vehicle 412. In addition, each clock source may have a random clock drift (e.g., $T_{drift0}$, $T_{drift1}$, $T_{drift2}$, etc.) caused by random noises (e.g., thermal noise, phase noise). The clock bias and clock drift can introduce clock errors between the two clock sources. As a result, the difference between the recorded ToD and ToA includes a first component representing the true ToF of PRS 432 between RSU 402 and vehicle 412, and a second component caused by the clock error between the two clock sources. For example, in FIG. 5B, the difference between t1 (the timestamp of ToD of PRS 432 at RSU 402) and t2 (the timestamp of ToA of PRS 432 at vehicle 412) include the clock offset $T_{bias}$ as well as random clock drifts $T_{drift0}$ when t1 is recorded and $T_{drift2}$ when t2 is recorded. The actual RTT between vehicle 412 and RSU 402 can be represented by the following equation:

$$\text{RTT}_{RSU\text{-}402\text{-}actual} = (t4 - t3) + (t2 - t1) + \text{clock\_error} \qquad \text{(Equation 3)}$$

In equation 3, clock_error can represent the clock error between vehicle 412 and RSU 402 and can include the clock offset $T_{bias}$ as well as random clock drifts $T_{drift0}$ and $T_{drift1}$. The actual RTT $\text{RTT}_{RSU\text{-}402\text{-}actual}$ can represent the actual relative distance between RSU 402 and vehicle 412. As shown in Equation 3, if vehicle 412 uses the time difference between t1 and t2 as the ToF from RSU 402 to vehicle 412 without accounting for the clock error component, the clock error can lead to an overestimation or underestimation of the relative distance between RSU 402 and vehicle 412 and introduce error in the position estimation of vehicle 412.

Figure 5C:
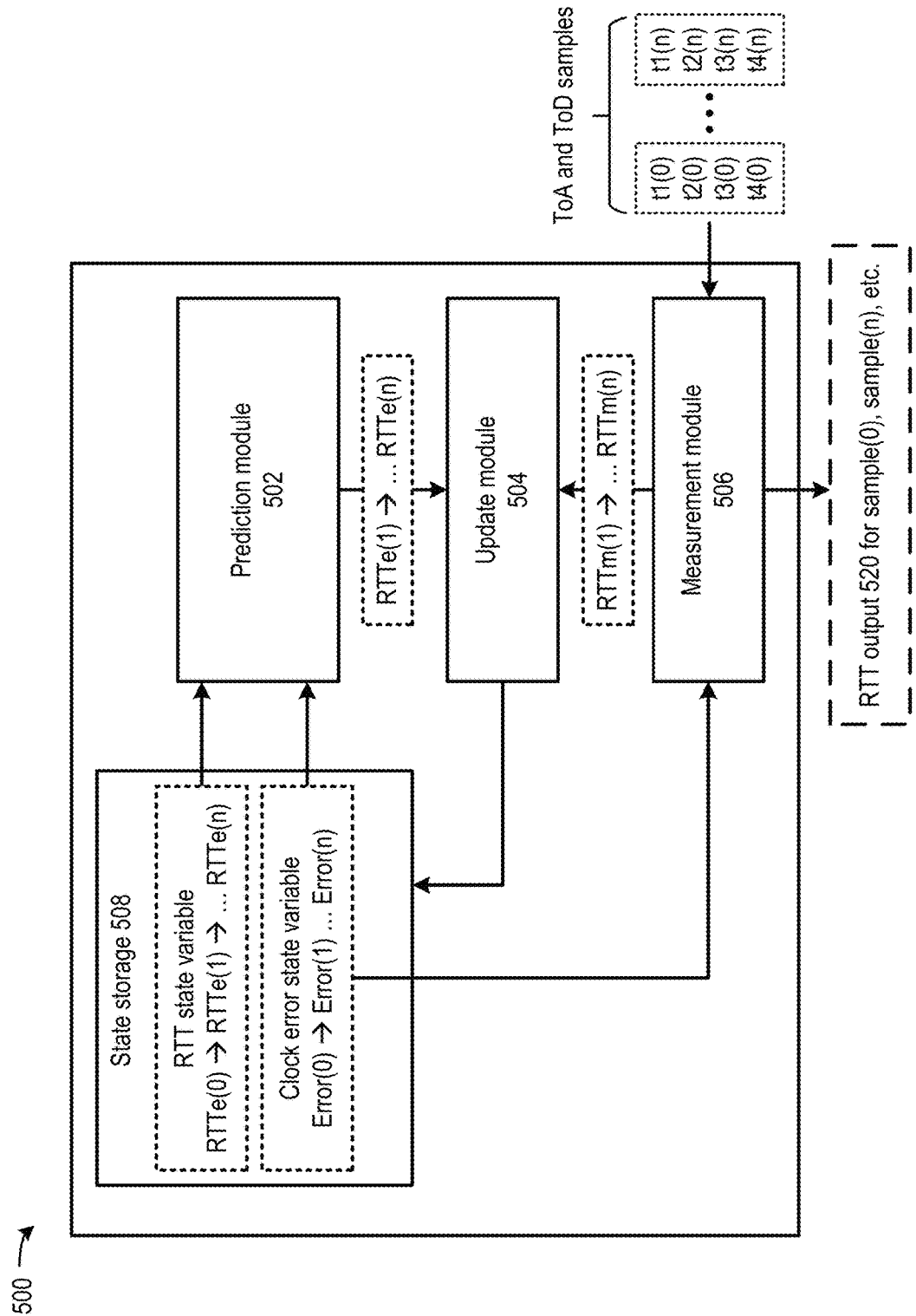

To reduce the effect of clock error on the accuracy of RTT measurement, vehicle 412 can employ techniques, such as Kalman filtering, to estimate both the true RTT between the vehicle and RSU 402 and the clock error based on multiple instances of PRS exchange between vehicle 412 and RSU 402. FIG. 5C illustrates an example of a Kalman filter 500 that can be implemented in vehicle 412. In some examples, Kalman filter 500 can be implemented as part of SW 212 executable by processor 230. As shown in FIG. 5C, Kalman filter 500 can include a prediction module 502, an update module 504, a measurement module 506, and a state storage 508. At the beginning of the estimation operation, measurement module 506 can combine the first samples of ToAs and ToDs from the first PRS exchange (t1(0), t1(0), t2(0), and t3(0)) with a default clock error (error(0)) to generate a first RTT measurement (RTTm(0)) from the first PRS exchange. Update module 504 can store the first RTT measurement as a first RTT estimate (RTTe(0)) in state storage 508 as the initial RTT state variable. Measurement module 506 can also output the first RTT estimate as RTT output 520 for sample (0).

Kalman filter 500 can then revise the RTT estimate and the clock error estimate based on second samples of ToAs and ToDs from the second PRS exchange. Specifically, prediction module 502 can estimate a second RTT (RTT(1)) to be obtained in a second PRS exchange. The estimation can be based on, for example, a speed of vehicle 412 and the time elapsed between the first and second PRS exchanges. Measurement module 506 can also perform a measurement of the second RTT (RTTm(1)) based on the second samples of ToAs and ToDs (t1(1), t1(1), t2(1), and t3(1)) and default clock error (error(0)). Update module 504 can compare the second RTT measurement (RTTm(1)) with the second RTT estimate (RTTe(1)) to determine a difference between the default clock error and the actual clock error, and the clock error state variable can be updated based on the difference to become error(1). The RTT estimate is also revised based on the revised clock error (error(1)) and the second samples of ToAs and ToDs. Measurement module 506 can recompute the second RTT measurement based on the revised clock error (error(1)) and generate an RTT output 520 for sample (1). The Kalman filtering process can then be repeated for subsequent samples of ToAs and ToDs (e.g., t1($n$), t2($n$), t3($n$), and t4($n$)) to refine the estimation of clock error.

Figure 5D:
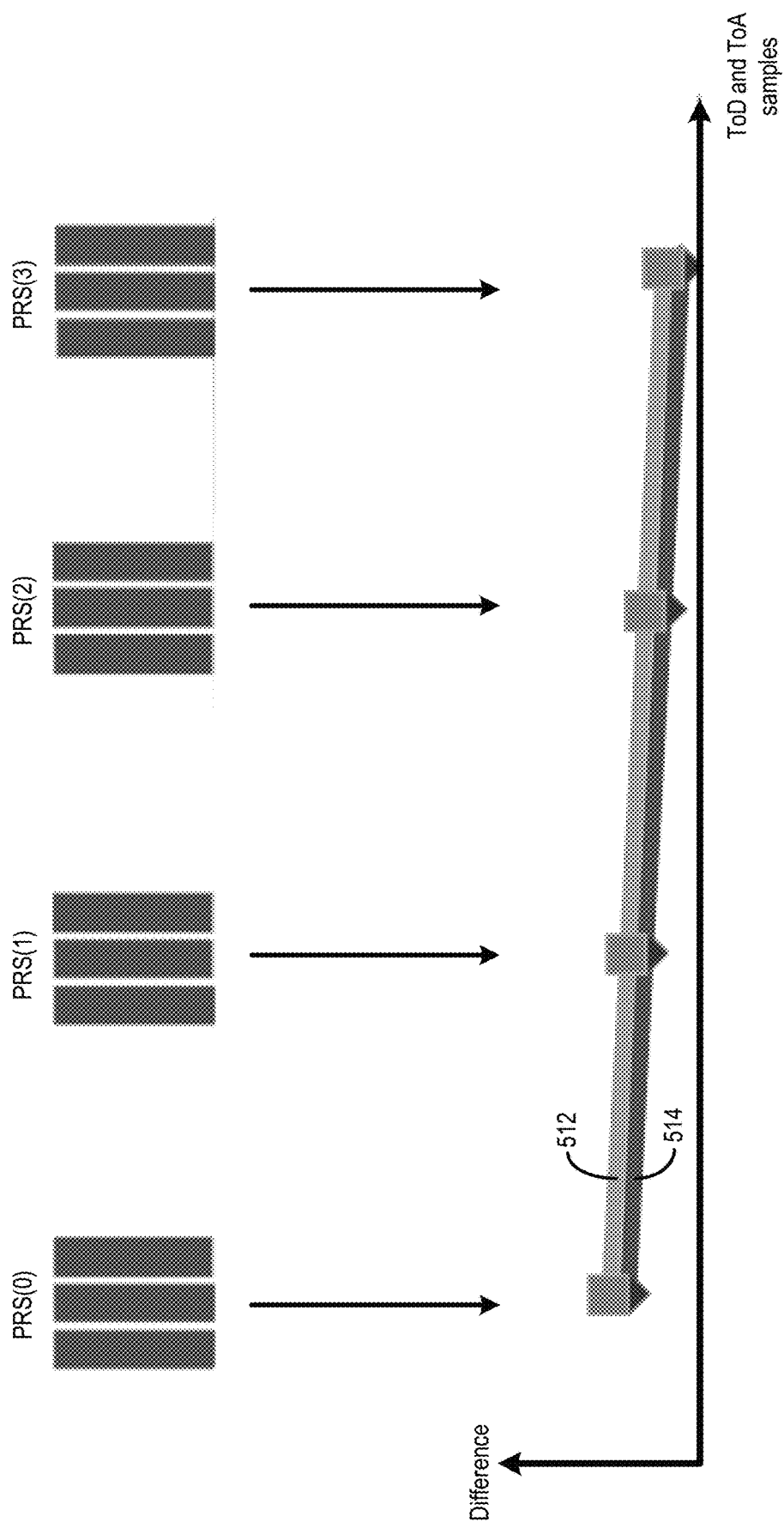

FIG. 5D illustrates the change in the differences between estimated clock error and actual clock error from Kalman filter 500. In FIG. 5D, a graph 512 indicating the difference between estimated clock bias and actual clock bias and a graph 514 indicating the difference between estimated clock drift and actual clock drift are shown. As shown in FIG. 5D, through the Kalman filtering process over multiple samples of ToAs and ToDs, both the differences between estimated clock bias and actual clock bias and between estimated clock drift and actual clock drift reduce between samples. The Kalman filter processing can be repeated over additional samples of ToAs and ToDs until the Kalman filter reaches steady state. The steady state can be reached when, for example, a change in the clock error state variable between two sets of samples of ToAs and ToDs (e.g., error(n−1) and error(n)) falls below a threshold. When the steady state is reached, Kalman filter 500 can stop the updating of RTT state variable and clock error state variable in state storage 508. Measurement module 506 can then output the RTT measurement generated from the steady state clock error as RTT output 520, for sample(n) of ToAs and ToDs.

Figure 5E:
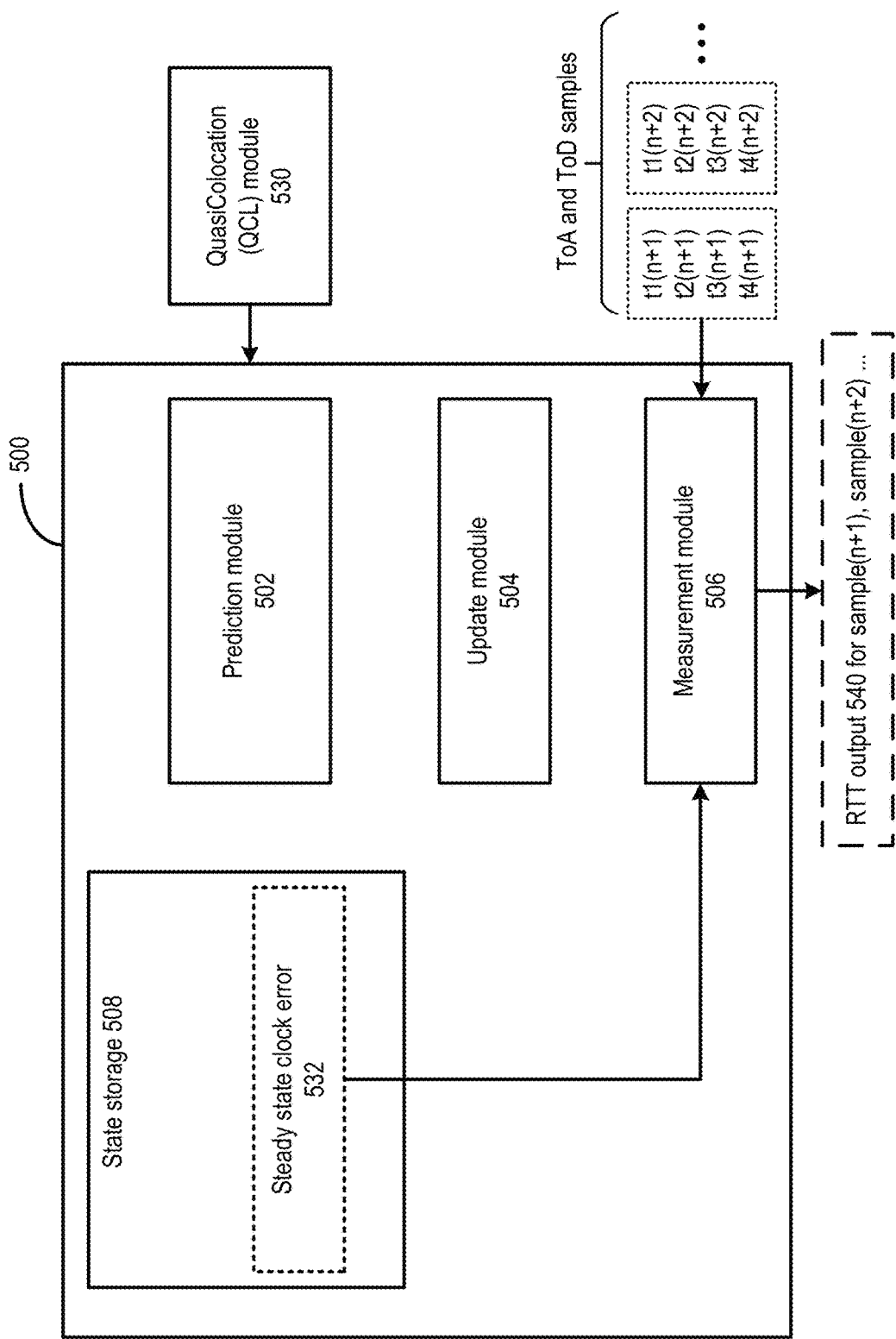

When the Kalman filter reaches a steady state, vehicle 412 can use the steady state clock error to refine the RTT measurements from subsequent PRSs exchanged between the vehicle and the terrestrial station in a QCL operation. FIG. 5E illustrates an example of QCL operation performed by a QCL module 530 which can be part of vehicle 412. In some examples, QCL module 530 can be implemented as SW 212 executable on processor 230. As shown in FIG. 5E, when Kalman filter 500 reaches a steady state and a steady state clock error 532 is stored in state storage 508, QCL module 530 can disable update prediction module 502 and update module 504 of Kalman filter 500, while enabling measurement module 506 to directly compute an RTT output 540 based on subsequent ToA and ToD samples (e.g., t1($n$+1), t2($n$+1), t3($n$+1), t4($n$+2), t1($n$+2), t2($n$+2), t3($n$+2), t4($n$+2)) and steady state clock error 532. The QCL operation can be based on an assumption that the subsequent ToA and ToD samples have the same large-scale properties of clock bias and clock drift as the prior ToA and ToD samples. As the RTT and clock error prediction and update operations of Kalman filtering can be slow and computation intensive, using the steady state clock error to directly compute the RTT allows efficient reduction of the effect of clock error on the RTT measurement.

Figure 6:
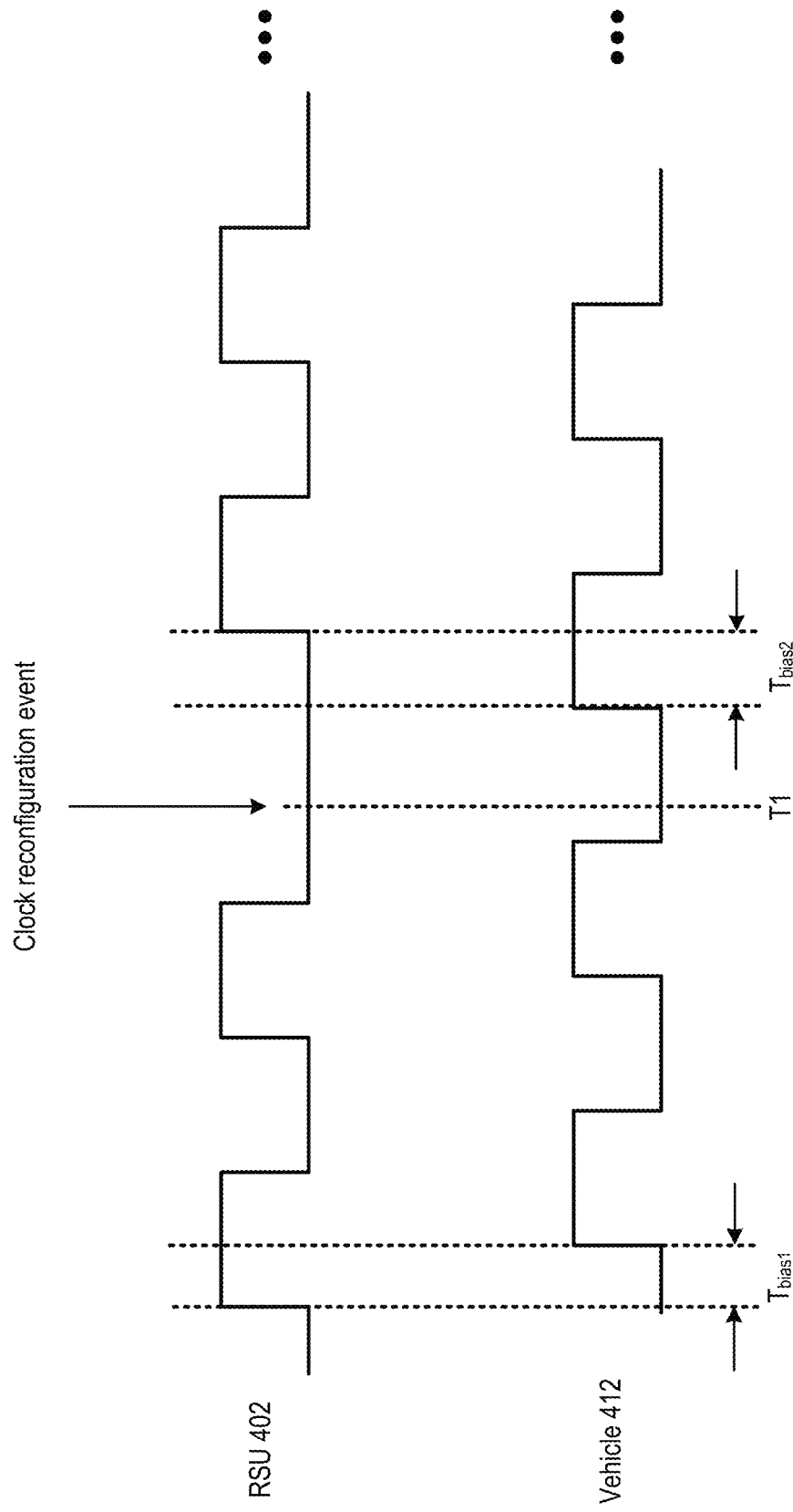
FIG. 6 illustrates example effects of a clock reconfiguration event on positioning operations.

Although the QCL operation can provide an efficient way to reduce the effect of clock error on the RTT measurement, the clock error reduction of the QCL operation can be compromised when the steady state clock error no longer corresponds to the actual clock error. FIG. 6 illustrates an example scenario where the clock error experiences significant changes. As shown in FIG. 6, prior to time T1, the clock of RSU 402 leads the clock of vehicle 412 by a clock bias $T_{bias1}$, which can be represented in a steady state clock error after Kalman filtering and is used to refine RTT measurements. Due to a clock reconfiguration event at RSU 420 at time T1, which can include, for example, a power-up event, a clock synchronization event, or a reconfiguration event of the local oscillator, the phase relationship between the clocks of RSU 402 and vehicle 412 change considerably. After time T1, the clock of vehicle 412 leads the clock of RSU 402 by a clock bias $T_{bias2}$. If QCL module 530 uses the steady state clock error, which represents the clock bias $T_{bias1}$, to refine RTT measurement after time T1, the QCL operation can introduce substantial error to the RTT measurement, since the steady state clock error no longer corresponds to the latest clock bias $T_{bias2}$.

Figure 7:
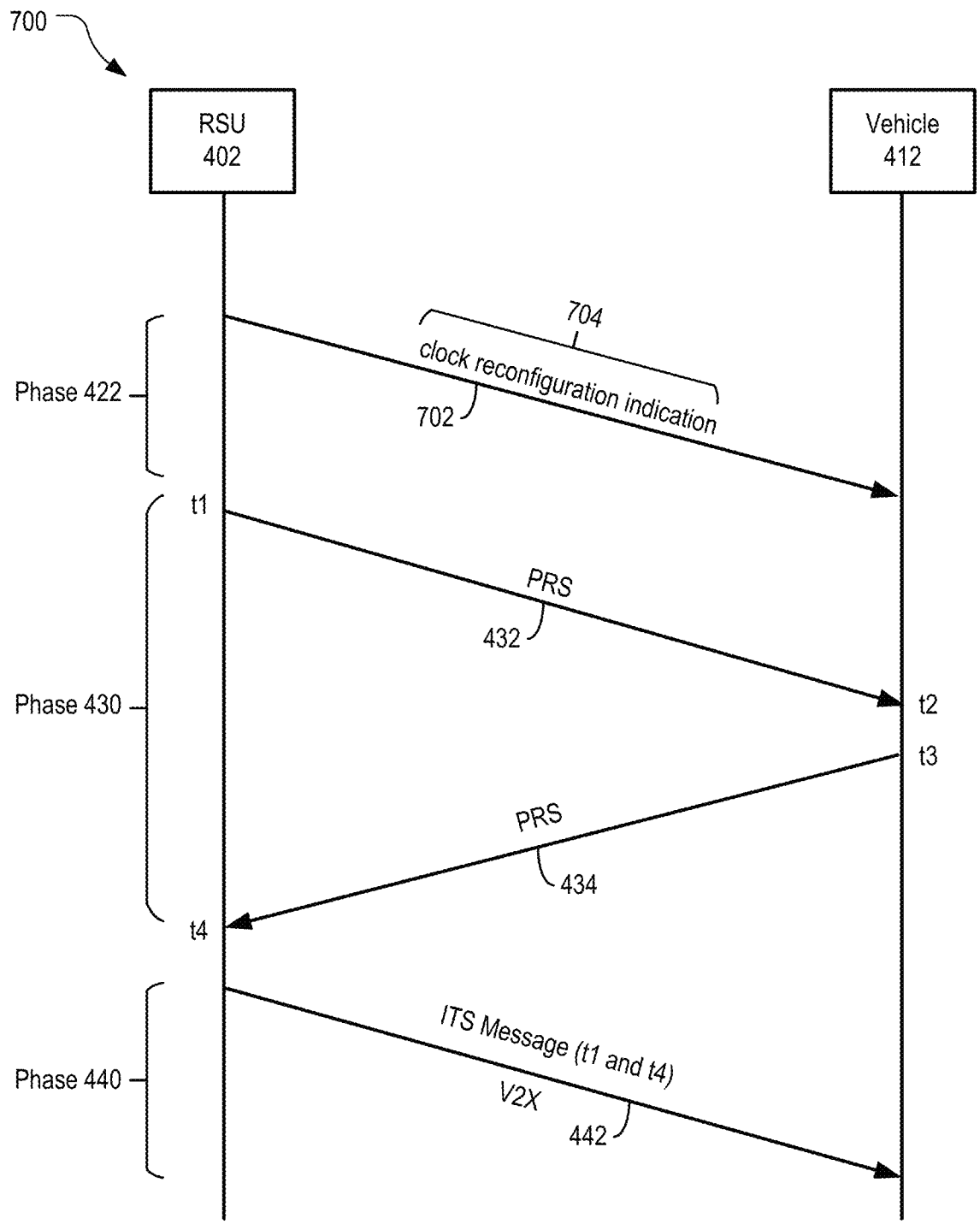
FIG. 7 illustrates example techniques to the effect of a clock reconfiguration event on positioning.

FIG. 7 illustrates an example of a message flow 700 between an RSU (e.g., RSU 402) and a vehicle (e.g., vehicle 412) that can improve a positioning operation in light of a clock reconfiguration event. Message flow 700 is modified from message flow 420 of FIG. 4A. As shown in FIG. 7, in phase 422 of the positioning operation, RSU 402 may transmit a message 702 including a clock reconfiguration indication 704. Clock reconfiguration indication 704 can indicate whether a clock reconfiguration event occurs at RSU 402 prior to transmission of PRS 432 in phase 424. In some examples, message 702 can be part of message 424 of FIG. 4B and includes identifier 426a (e.g., source ID of RSU 402) and transmission configuration information 426b (e.g., spectrum resource used in the transmission of PRSs). The transmission of message 702, as well as phase 422, can be performed before or after phase 430 in which PRSs 432 and 434 are exchanged between RSU 402 and vehicle 412, as described above. Following phase 430, RSU 402 can transmit, via ITS messaging, the recorded ToD of PRS 432 (t1) and recorded ToA of PRS 434 (t4) at RSU 402 to vehicle 412. As to be described in details below, vehicle 412 can estimate an RTT between RSU 402 and vehicle 412 based on the ToAs and ToDs of PRSs 432 and 434, as well as clock reconfiguration indication 704.

Figure 8:
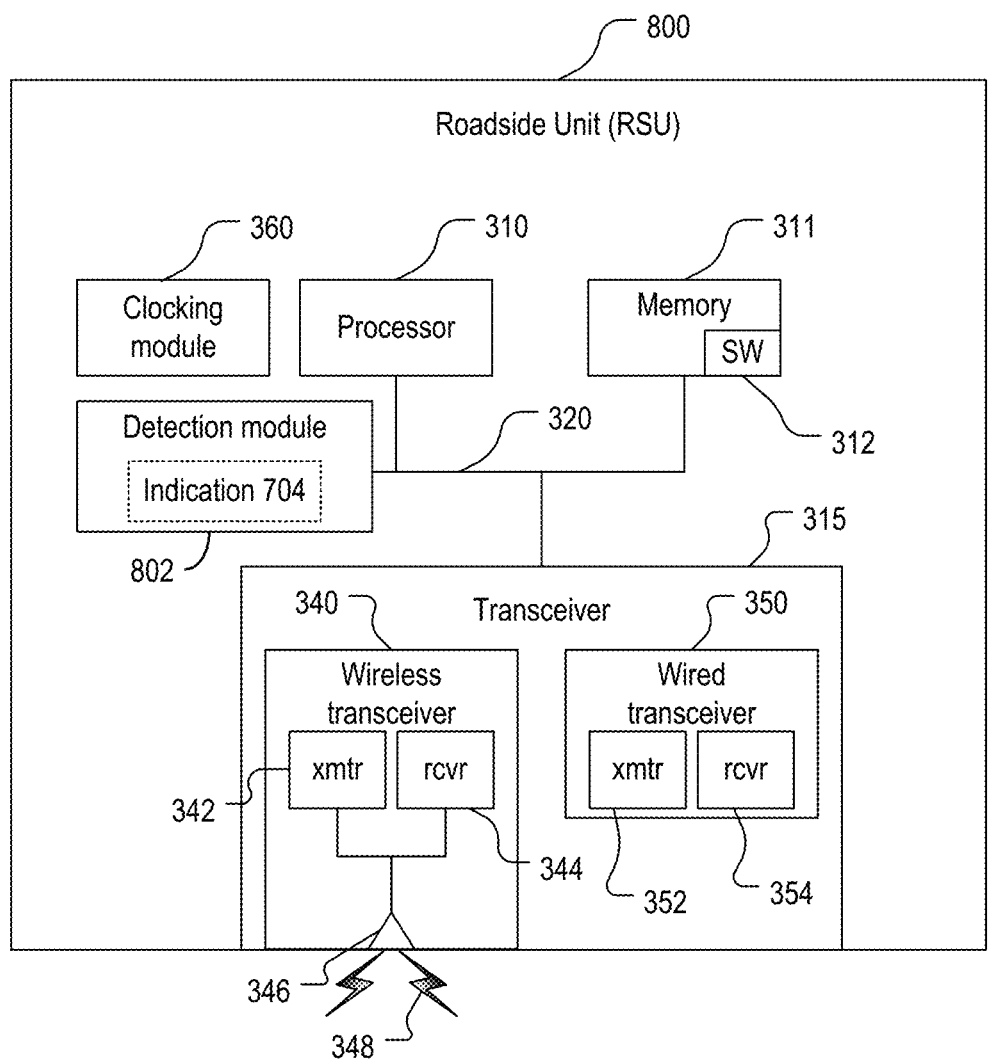
FIG. 8 is a block diagram of an example RSU that implements the techniques described in FIG. 7.

FIG. 8 illustrates an example of RSU 800 to support the example message flow 700 of FIG. 7. As shown in FIG. 8, in addition to processor 310, memory 311, transceiver 315, and clocking module 360, FIG. 8 further includes a detection module 802. Clock reconfiguration event detection module 802 can detect an event at RSU 800 that can lead to a clock reconfiguration at clocking module 360, such as a power-up event of RSU 800, a clock synchronization event for clocking module 360, or a reconfiguration event of a local oscillator of clocking module 360, and store clock reconfiguration indication 704. Clock reconfiguration indication 704 can be in the form of a flag bit that can be de-asserted by default and can be asserted when a clock reconfiguration event is detected. Processor 310 can obtain clock reconfiguration indication 704 from detection module 802 and include the indication in message 702, and then control transceiver 315 to transmit the message to vehicle 412. After transmitting message 702, processor 310 can de-assert clock reconfiguration indication 704, which can then be asserted by detection module 802 later upon detecting another event at RSU 800 that can lead to a clock reconfiguration at clocking module 360.

Figure 9:
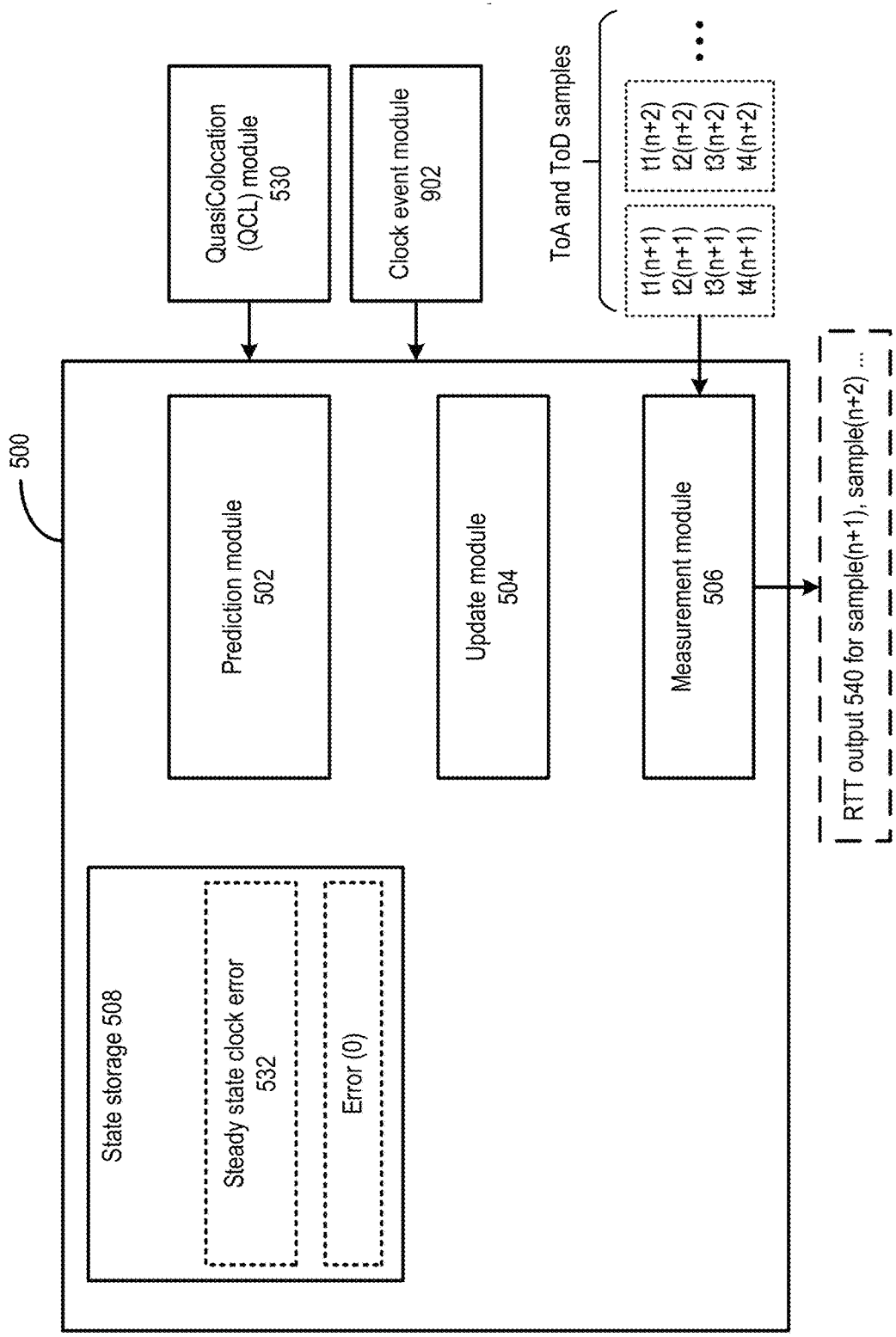
FIG. 9 is a block diagram of an example UE that implements the techniques described in FIG. 7.

FIG. 9 illustrates additional components of vehicle 412 to support a positioning operation based on message flow 700. As shown in FIG. 9, in addition to Kalman filter 500 and QCL module 530, vehicle 412 further includes a clock event module 902. Clock event module 902 can extract clock reconfiguration indication 704 from message 702 and determine whether a clock reconfiguration event occurs prior to exchange of PRSs between vehicle 412 and RSU 402 in phase 430. If the clock reconfiguration event occurs, clock event module 902 can disable the QCL operation and reset the clock error state variable to the default clock error (error(0)), and restart prediction module 502 and update module 504 to re-estimate the clock error between RSU 402 and vehicle 412 based on the subsequent samples of ToA and ToD (e.g., t1(n+1), t2(n+1), t3(n+1), t4(n+2), t1(n+2), t2(n+2), t3(n+2), t4(n+2)), as described in FIG. 5C. On the other hand, if no clock reconfiguration event occurs, clock event module 902 can allow QCL operation to continue, such that RTT outputs 540 for the subsequent samples of ToA and ToD are generated based on steady state clock error 532 stored in state storage 508.

Figure 10:
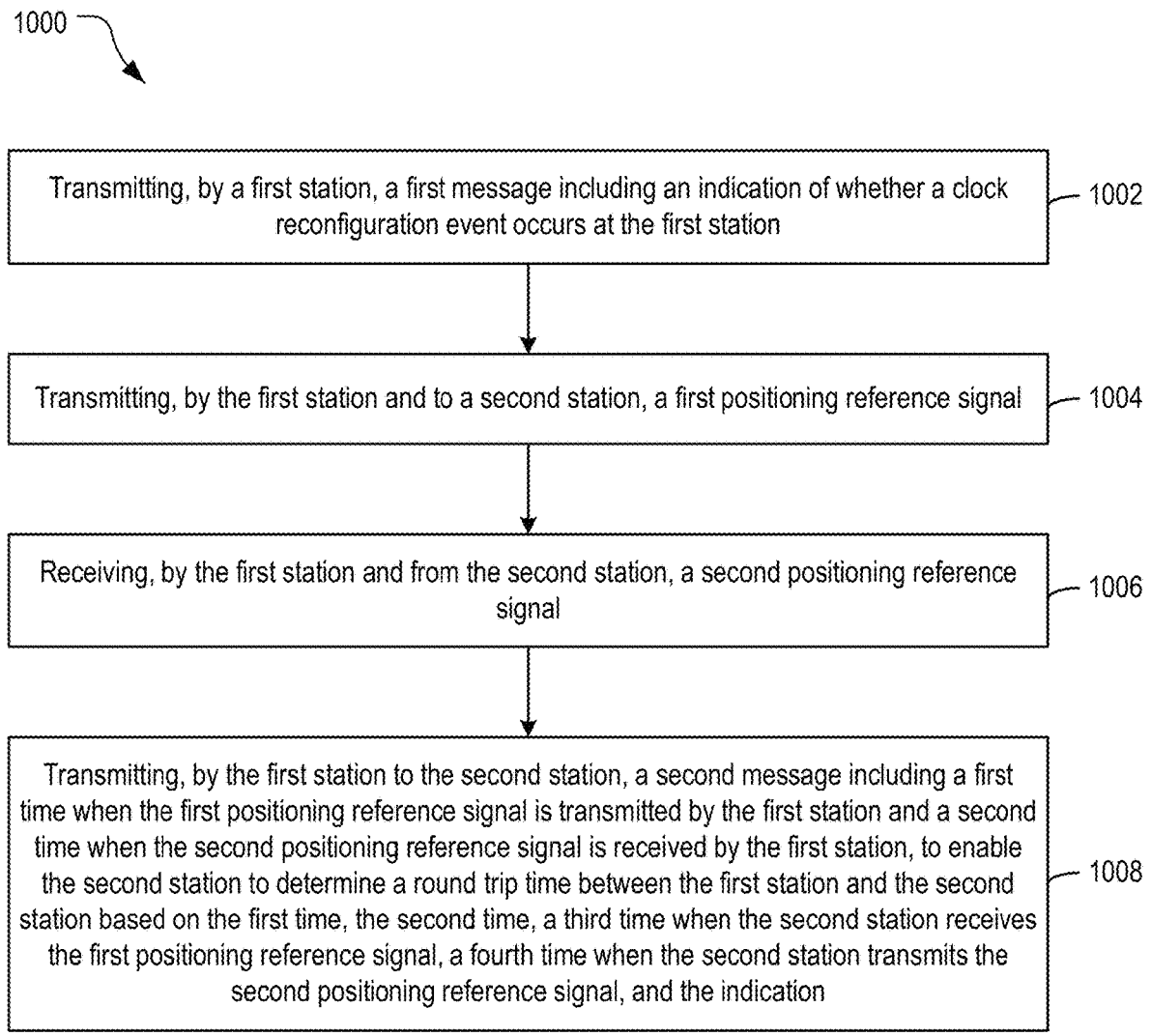
FIG. 10 is a process flow diagram of an example method for determining a position of a vehicle.

FIG. 10 illustrates an example method 1000 that can be performed by a first station, which can be a terrestrial station such as RSU 402 and RSU 404, to facilitate a positioning operation at a second station, which can be part of a vehicle such as vehicle 412.

In operation 1002, the first station transmits a first message, such as message 702 of FIG. 7, including an indication of whether a clock reconfiguration event occurs at the first station. The clock reconfiguration event can include, for example, a power-up event, a clock synchronization event at a local clock source of the first station, or a reconfiguration of an oscillator of the local clock source. The first message may include other information, such as an identifier of the first station which allows the second station to determine a location of the first station, frequency spectrum resources used by the first station to transmit PRSs to the second station, scheduled time of transmission of the PRS, etc. In some examples, the first message can be transmitted prior to the exchange of PRSs between the first station and the second station if the PRSs are transmitted on a licensed spectrum. In some examples, the first message can be transmitted after the exchange of the PRSs, if the PRSs are transmitted on an unlicensed spectrum and the times of transmission of the PRSs are not known.

In operation 1004, the first station transmits a first PRS to the second station. Referring to FIG. 7, the first PRS can correspond to PRS 432. In some examples, the first PRS is transmitted via a V2X sidelink and an associated sidelink protocol.

In operation 1006, the first station receives from the second station a second PRS. Referring to FIG. 7, the second PRS can correspond to PRS 434. In some examples, the second PRS is transmitted via a V2X sidelink and the associated sidelink protocol.

In operation 1008, the first station transmits to the second station a second message including a first time when the first PRS is transmitted by the first station and a second time when the second PRS is received by the first station, to enable the second station to determine an RTT between the first station and the second station based on the first time, the second time, a third time when the second station receives the first PRS, a fourth time when the second station transmits the second PRS, and the indication. The second message can include an ITS message in a V2X implementation.

Specifically, referring to FIG. 7, the first time can correspond to the time of transmission of t PRS 432 (t1) at RSU 402, whereas the second time can correspond to the time of reception of PRS 434 (t4) at RSU 402. Moreover, the third time can correspond to a time of transmission of the PRS 434 (t3) at vehicle 412, whereas the fourth time can correspond to a time of reception of PRS 432 (t4) at vehicle 412. The first time and the second time can be measured using a local clock source of RSU 402 (e.g., clocking module 360), whereas the third time and the fourth time can be measured using a local clock source of vehicle 412 (e.g., clocking module 290). In addition, there may exist a clock error between the two local clock sources, where the clock error can include a static clock bias/offset between the two local clock sources as well as dynamic clock drifts at the two local clock sources.

The second station may include a Kalman filter to estimate the clock error and to determine the RTT based on the estimated clock error and the first time, the second time, the third time, and the fourth time based on equation 3. The second station may perform a QCL operation and use a prior clock error estimate to estimate the actual clock error, and to refine the RTT measurement using the prior clock error estimate. But if the indication from the first message indicates a clock reconfiguration event at the first station, the second station may disable the QCL operation and restart the Kalman filter to generate a current estimate of the clock error between the two stations, and use the current estimate to refine the RTT measurement.

Figure 11:
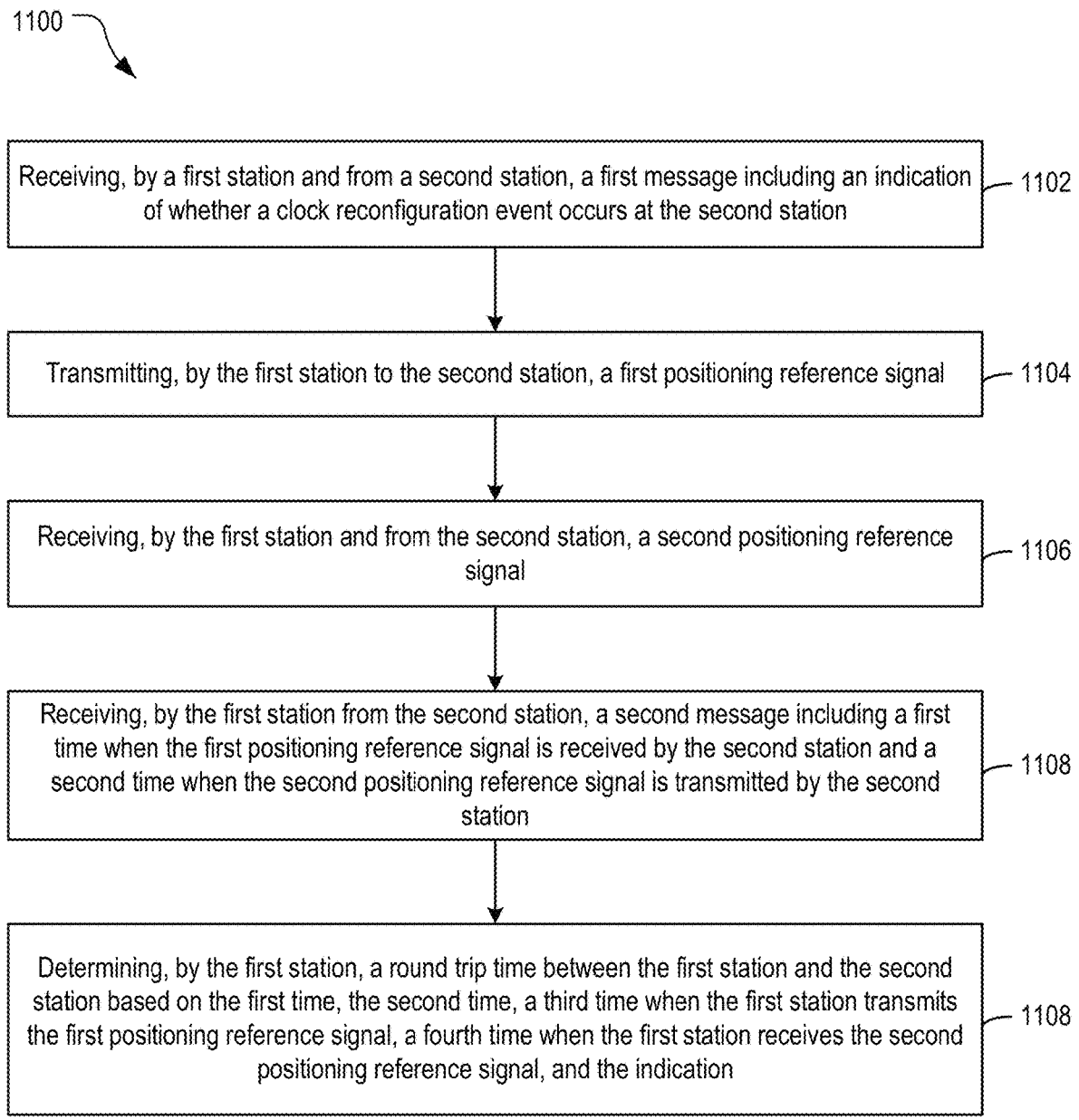
FIG. 11 is a process flow diagram of another example method for determining a position of a vehicle.

FIG. 11 illustrates an example method 1100 that can be performed by a first station, which can be part of a vehicle such as vehicle 412 to estimate an RTT between the first station and a second station, which can be a terrestrial station such as RSU 402 and RSU 404.

In operation 1102, the first station receives a first message from the second station, such as message 702 of FIG. 7, including an indication of whether a clock reconfiguration event occurs at the first station. The clock reconfiguration event can include, for example, a power-up event, a clock synchronization event at a local clock source of the second station, or a reconfiguration of an oscillator of the local clock source. The first message may include other information, such as an identifier of the second station which allows the first station to determine a location of the second station, frequency spectrum resources used by the second station to transmit PRS to the first station, or scheduled time of transmission of the PRS. In some examples, the first message can be transmitted prior to the exchange of PRSs between the first station and the second station if the PRSs are transmitted on a licensed spectrum. In some examples, the first message can be transmitted after the exchange of the PRSs, if the PRSs are transmitted on an unlicensed spectrum and the times of transmission of the PRSs are not known.

In operation 1104, the first station transmits a first PRS to the second station. Referring to FIG. 7, the first PRS can correspond to PRS 434. In some examples, the first PRS is transmitted via a V2X sidelink and an associated sidelink protocol.

In operation 1106, the first station receives from the second station a second PRS. Referring to FIG. 7, the second PRS can correspond to PRS 434. In some examples, the second PRS is transmitted via a V2X sidelink and the associated sidelink protocol.

In operation 1108, the first station receives from the second station a second message including a first time when the first PRS is received by the second station and a second time when the second PRS is received by the second station, to enable the second station to determine an RTT between the first station and the second station based on the first time, the second time, a third time when the second station receives the first PRS, a fourth time when the second station transmits the second PRS, and the indication. The second message can include an ITS message in a V2X implementation.

In operation 1110, the first station determines an RTT between the first station and the second station based on the first time, the second time, a third time when the first station transmits the first PRS, a fourth time when the first station receives the second PRS, and the indication.

Specifically, referring to FIG. 7, the first time can correspond to the reception of PRS 434 at RSU 402 (t4), whereas the second time can correspond to the transmission of PRS 432 at RSU 402 (M. Moreover, the third time can correspond to a time of transmission of PRS 434 at vehicle 412, whereas the fourth time can correspond to a time of reception of PRS 432 (t2) at vehicle 412. The first time and the second time can be measured using a local clock source of RSU 402 (e.g., clocking module 360), whereas the third time and the fourth time can be measured using a local clock source of vehicle 412 (e.g., clocking module 290). In addition, there may exist a clock error between the two local clock sources, where the clock error can include a static clock bias/offset between the two local clock sources as well as dynamic clock drifts at the two local clock sources.

The second station may include a Kalman filter to estimate the clock error and to determine the RTT based on the estimated clock error and the first time, the second time, the third time, and the fourth time based on equation 3. The second station may perform a QCL operation and use a prior clock error estimate to estimate the actual clock error, and to refine the RTT measurement using the prior clock error estimate. But if the indication from the first message indicates a clock reconfiguration event at the first station, the second station may disable the QCL operation and restart the Kalman filter to generate a current estimate of the clock error between the two stations, and use the current estimate to refine the RTT measurement.

In some examples, the first station can perform method 1100 with multiple terrestrial stations to obtain different RTT measurements with the multiple terrestrial stations. From the different RTT measurements, the first station can obtain time offsets between the multiple terrestrial stations. Based on the time offsets and the known locations of the multiple terrestrial stations, the first station can estimate its location based on Equation 1.

Other examples and implementations are within the scope and spirit of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations.

As used herein, the singular forms "a," "an," and "the" include the plural forms as well, unless the context clearly indicates otherwise. The terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Also, as used herein, "or" as used in a list of items prefaced by "at least one of" or prefaced by "one or more of" indicates a disjunctive list such that, for example, a list of "at least one of A, B, or C," or a list of "one or more of A, B, or C" means A, or B, or C, or AB (A and B), or AC (A and C), or BC (B and C), or ABC (A and B and C), or combinations with more than one feature (e.g., AA, AAB, ABBC). Thus, a recitation that an item, e.g., a processor, is configured to perform a function regarding at least one of A or B means that the item may be configured to perform the function regarding A, or may be configured to perform the function regarding B, or may be configured to perform the function regarding A and B. For example, the phrase "a processor configured to measure at least one of A or B" means that the processor may be configured to measure A (and may or may not be configured to measure B), or may be configured to measure B (and may or may not be configured to measure A), or may be configured to measure A and B (and may be configured to select which, or both, of A and B to measure). Similarly, a recitation of a means for measuring at least one of A or B includes means for measuring A (which may or may not be able to measure B), or means for measuring B (which may or may not be configured to measure A), or means for measuring A and B (which may be able to select which, or both, of A and B to measure).

Substantial variations may be made in accordance with specific requirements. For example, customized hardware might also be used, and/or particular elements might be implemented in hardware, software (including portable software, such as applets) executed by a processor, or both. Further, connection to other computing devices such as network I/O devices may be employed.

The systems and devices discussed above are examples. Various configurations may omit, substitute, or add various procedures or components as appropriate. For instance, features described with respect to certain configurations may be combined in various other configurations. Different aspects and elements of the configurations may be combined in a similar manner. Also, technology evolves, and thus many of the elements are examples and do not limit the scope of the disclosure or claims.

A wireless communication system is one in which communications are conveyed wirelessly, i.e., by electromagnetic and/or acoustic waves propagating through atmospheric space rather than through a wire or other physical connection. A wireless communication network may not have all communications transmitted wirelessly but is configured to have at least some communications transmitted wirelessly. Further, the term "wireless communication device," or similar terms, does not require that the functionality of the device is exclusively, or even primarily, for communication, or that the device be a mobile device, but indicates that the device includes wireless communication capability (one-way or two-way), e.g., includes at least one radio (each radio being part of a transmitter, receiver, or transceiver) for wireless communication.

Specific details are given in the description to provide a thorough understanding of example configurations (including implementations). However, configurations may be practiced without these specific details. For example, well-known circuits, processes, algorithms, structures, and techniques have been shown without unnecessary detail to avoid obscuring the configurations. This description provides example configurations only and does not limit the scope, applicability, or configurations of the claims. Rather, the preceding description of the configurations provides a description for implementing described techniques. Various changes may be made in the function and arrangement of elements without departing from the spirit or scope of the disclosure.

The terms "processor-readable medium," "machine-readable medium," and "computer-readable medium," as used herein, refer to any medium that participates in providing data that causes a machine to operate in a specific fashion. Using a computing platform, various computer-readable media might be involved in providing instructions/code to processor(s) for execution and/or might be used to store and/or carry such instructions/code (e.g., as signals). In many implementations, a computer-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

"About" and/or "approximately," as used herein, when referring to a measurable value such as an amount, a temporal duration, and the like, encompasses variations of ±20% or ±10%, ±5%, or +0.1% from the specified value, as appropriate in the context of the systems, devices, circuits, methods, and other implementations described herein. "Substantially," as used herein, when referring to a measurable value such as an amount, a temporal duration, a physical attribute (such as frequency), and the like, also encompasses variations of ±20% or ±10%, ±5%, or +0.1% from the specified value, as appropriate in the context of the systems, devices, circuits, methods, and other implementations described herein.

A statement that a value exceeds (or is more than or above) a first threshold value is equivalent to a statement that the value meets or exceeds a second threshold value that is slightly greater than the first threshold value, e.g., the second threshold value being one value higher than the first threshold value in the resolution of a computing system. A statement that a value is less than (or is within or below) a first threshold value is equivalent to a statement that the value is less than or equal to a second threshold value that is slightly lower than the first threshold value, e.g., the second threshold value being one value lower than the first threshold value in the resolution of a computing system.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of operations may be undertaken before, during, or after the above elements are considered. Accordingly, the above description does not bound the scope of the claims.

The invention claimed is:

1. A method, comprising:
transmitting, by a first station, a first message including an indication of whether a clock reconfiguration event occurs at the first station, wherein the reconfiguration event is at a local clock source of the first station and changes properties of the local clock at the first station and wherein the reconfiguration event at the local clock source changes a clock error between the first station and a second station;
transmitting, by the first station, a first positioning reference signal (PRS);
receiving, by the first station and from the second station, a second PRS; and
transmitting, by the first station to the second station, a second message including a first time when the first PRS is transmitted by the first station and a second time when the second PRS is received by the first station, to enable the second station to determine a roundtrip time (RTT) between the first station and the second station based on the first time, the second time, a third time when the second station receives the first PRS, a fourth time when the second station transmits the second PRS, and the indication, wherein the indication is used by the second station to determine whether to utilize a prior estimate of clock error associated with the local clock of the first station in conjunction with a Quasi CoLocation (QCL) operation or whether to disable the QCL operation and generate a new estimate of the clock error.

2. The method of claim 1, wherein the indication indicates whether the clock reconfiguration event occurs at the first station prior to the first station transmitting the first positioning reference.

3. The method of claim 2, wherein the first time and the second time are obtained based on clock signals of the local clock source of the first station.

4. The method of claim 3, wherein the second station includes a Kalman filter to estimate the clock error between the first station and the second station and store an estimate of the clock difference error; and
wherein the indication enables the second station to, based on the indication, perform one of: resetting the prior estimate of the clock error stored in the Kalman filter to obtain an updated estimate of the clock difference error, or using the prior estimate of the clock error to estimate the RTT in a QCL operation.

5. The method of claim 1, wherein the first message includes an identifier of the first station to enable the second station to determine a location of the first station based on the identifier.

6. The method of claim 5, further comprising determining a location of the second station based on the location of the first station and the RTT.

7. The method of claim 1, wherein the first message includes one or more carrier frequencies used in the transmission of the first PRS.

8. The method of claim 1, wherein the first message includes a scheduled time window of transmission of the first PRS; and wherein the first message is transmitted prior to the transmission of the first PRS.

9. The method of claim 1, wherein the first PRS and the second PRS are transmitted via an unlicensed spectrum.

10. The method of claim 9, wherein the first message is transmitted after the transmission of the first PRS.

11. The method of claim 1, wherein the first PRS and the second PRS are transmitted via a vehicle-to-everything (V2X) sidelink and an associated sidelink protocol.

12. The method of claim 11, wherein the V2X sidelink is within an intelligent transportation systems (ITS) frequency spectrum including 5.9 GHz.

13. The method of claim 1, wherein the first station is part of a roadside unit (RSU), and wherein the second station is part of a vehicle.

14. A method, comprising:
receiving, by a first station from a second station, a first message including an indication of whether a clock reconfiguration event occurs at the second station, wherein the reconfiguration event is at a local clock source of the second station and changes properties of the local clock at the second station and wherein the reconfiguration event at the local clock source changes a clock error between the first station and the second station;
transmitting, by the first station and to the second station, a first PRS;
receiving, by the first station and from the second station, a second PRS;
receiving, by the first station from the second station, a second message including a first time when the first PRS is received by the second station and a second time when the second PRS is transmitted by the second station; and
determining, by the first station, an RTT between the first station and the second station based on the first time, the second time, a third time when the first station transmits the first PRS, a fourth time when the first station receives the second PRS, and the indication, wherein the indication is used to determine whether to utilize a prior estimate of clock error associated with the local clock of the second station in conjunction with a Quasi CoLocation (QCL) operation or whether to disable the QCL operation and generate a new estimate of the clock error.

15. The method of claim 14, wherein the indication indicates whether the clock reconfiguration event occurs at the second station prior to the second station transmitting the second positioning reference.

16. The method of claim 15, wherein the first time and the second time are obtained based on clock signals of the local clock source of the second station.

17. The method of claim 16, wherein the first station includes a Kalman filter to estimate the clock error between the first station and the second station and to store an estimate of the clock difference error; and
wherein the method further comprises, based on the indication, performing one of the following: resetting the prior estimate of the clock error stored in the Kalman filter to obtain an updated estimate of the clock difference error, or using the prior estimate of the clock error to estimate the RTT in a QCL operation.

18. The method of claim 14, wherein the first message includes an identifier of the second station;
wherein the method further comprises determining a location of the second station based on the identifier.

19. The method of claim 18, further comprising determining a location of the first station based on the location of the second station and the RTT.

20. The method of claim 14, wherein the first message includes one or more carrier frequencies used in the transmission of the second PRS.

21. The method of claim 14, wherein the first message includes a scheduled time window of transmission of the second PRS; and
wherein the first message is transmitted prior to the transmission of the second PRS.

22. The method of claim 14, wherein the first PRS and the second PRS are transmitted via an unlicensed spectrum.

23. The method of claim 22, wherein the first message is received after the second PRS is received.

24. The method of claim 14, wherein the first PRS and the second PRS are transmitted via a V2X sidelink and an associated sidelink protocol; and
wherein the V2X sidelink is within an ITS frequency spectrum including 5.9 GHz.

25. The method of claim 14, wherein the first station is part of a vehicle, and wherein the second station is part of a RSU.

26. An apparatus, the apparatus being part of a first station and comprising:
a memory configured to store a set of instructions; and
a processor configured to execute the set of instructions to perform:
transmitting a first message including an indication of whether a clock reconfiguration event occurs at the first station, wherein the reconfiguration event is at a local clock source of the first station and changes properties of the local clock at the first station and wherein the reconfiguration event at the local clock source changes a clock error between the first station and a second station;
transmitting a first PRS;
receiving from a second station a second PRS; and
transmitting to the second station a second message including a first time when the first PRS is transmitted by the first station and a second time when the second PRS is received by the first station, to enable the second station to determine an RTT between the first station and the second station based on the first time, the second time, a third time when the second station receives the first PRS, a fourth time when the second station transmits the second PRS, and the indication, wherein the indication is used by the second station to determine whether to utilize a previous estimate of clock error associated with the local clock of the first station in conjunction with a Quasi CoLocation (QCL) operation or whether to disable the QCL operation and generate a new estimate of the clock error.

27. The apparatus of claim 26, wherein the first PRS and the second PRS are transmitted via a V2X sidelink and an associated sidelink protocol; and
wherein the V2X sidelink is within an ITS frequency spectrum including 5.9 GHz.

28. The apparatus of claim 26, wherein the first station is part of a vehicle; and
wherein the second station is part of an RSU.

29. An apparatus, the apparatus being part of a first station and comprising:
a memory configured to store a set of instructions; and
a processor configured to execute the set of instructions to perform:

receiving from a second station a first message including an indication of whether a clock reconfiguration event occurs at the second station, wherein the reconfiguration event is at a local clock source of the second station and changes properties of the local clock at the second station and wherein the reconfiguration event at the local clock source changes a clock error between the first station and the second station;
transmitting to the second station a first PRS;
receiving from the second station a second PRS;
receiving from the second station a second message including a first time when the first PRS is received by the second station and a second time when the second PRS is transmitted by the second station; and
determining an RTT between the first station and the second station based on the first time, the second time, a third time when the first station transmits the first PRS, a fourth time when the first station receives the second PRS, and the indication, wherein the indication is used to determine whether to utilize a previous estimate of clock error associated with the local clock of the second station in conjunction with a Quasi CoLocation (QCL) operation or whether to disable the QCL operation and generate a new estimate of the clock error.

30. The apparatus of claim 29, wherein the first PRS and the second PRS are transmitted via a V2X sidelink and an associated sidelink protocol; and
wherein the V2X sidelink is within an ITS frequency spectrum including 5.9 GHz.

31. The apparatus of claim 29, wherein the first station is part of a vehicle, and wherein the second station is part of an RSU.

32. An apparatus, the apparatus being part of a first station and comprising:
means for transmitting a first message including an indication of whether a clock reconfiguration event occurs at the first station, wherein the reconfiguration event is at a local clock source of the first station and changes properties of the local clock at the first station and wherein the reconfiguration event at the local clock source changes a clock error between the first station and a second station;
means for transmitting a first PRS;
means for receiving from a second station a second PRS; and
means for transmitting to the second station a second message including a first time when the first PRS is transmitted by the first station and a second time when the second PRS is received by the first station, to enable the second station to determine an RTT between the first station and the second station based on the first time, the second time, a third time when the second station receives the first PRS, a fourth time when the second station transmits the second PRS, and the indication, wherein the indication is used by the second station to determine whether to utilize a previous estimate of clock error associated with the local clock of the first station in conjunction with a Quasi CoLocation (QCL) operation or whether to disable the QCL operation and generate a new estimate of the clock error.

33. The apparatus of claim 32, wherein the first PRS and the second PRS are transmitted via a V2X sidelink and an associated sidelink protocol; and
wherein the V2X sidelink is within an ITS frequency spectrum including 5.9 GHz.

34. The apparatus of claim 32, wherein the first station is part of a vehicle, and wherein the second station is part of a RSU.

35. An apparatus, the apparatus being part of a first station and comprising:
means for receiving from a second station a first message including an indication of whether a clock reconfiguration event occurs at the second station, wherein the reconfiguration event is at a local clock source of the second station and changes properties of the local clock at the second station and wherein the reconfiguration event at the local clock source changes a clock error between the first station and the second station;
means for transmitting to the second station a first PRS;
means for receiving from the second station a second PRS;
means for receiving from the second station a second message including a first time when the first PRS is received by the second station and a second time when the second PRS is transmitted by the second station; and
means for determining an RTT between the first station and the second station based on the first time, the second time, a third time when the first station transmits the first PRS, a fourth time when the first station receives the second PRS, and the indication, wherein the indication is used to determine whether to utilize a previous estimate of clock error associated with the local clock of the second station in conjunction with a Quasi CoLocation (QCL) operation or whether to disable the QCL operation and generate a new estimate of the clock error.

36. The apparatus of claim 35, wherein the first PRS and the second PRS are transmitted via a V2X sidelink and an associated sidelink protocol; and
wherein the V2X sidelink is within an ITS frequency spectrum including 5.9 GHz.

37. The apparatus of claim 35, wherein the first station is part of a vehicle, and wherein the second station is part of a RSU.

38. A non-transitory computer-readable medium storing instructions that, when executed by a hardware processor of a first station, causes the hardware processor to perform:
transmitting a first message including an indication of whether a clock reconfiguration event occurs at the first station, wherein the reconfiguration event is at a local clock source of the first station and changes properties of the local clock at the first station and wherein the reconfiguration event at the local clock source changes a clock error between the first station and a second station;
transmitting a first PRS;
receiving from a second station a second PRS; and
transmitting to the second station a second message including a first time when the first PRS is transmitted by the first station and a second time when the second PRS is received by the first station, to enable the second station to determine an RTT between the first station and the second station based on the first time, the second time, a third time when the second station receives the first PRS, a fourth time when the second station transmits the second PRS, and the indication, wherein the indication is used by the second station to determine whether to utilize a previous estimate of clock error associated with the local clock of the first station in conjunction with a Quasi CoLocation (QCL)

operation or whether to disable the QCL operation and generate a new estimate of the clock error.

39. The non-transitory computer-readable medium of claim 38, wherein the first PRS and the second PRS are transmitted via a V2X sidelink and an associated sidelink protocol; and wherein the V2X sidelink is within an ITS frequency spectrum including 5.9 GHz.

40. The non-transitory computer-readable medium of claim 38, wherein the first station is part of a vehicle; and wherein the second station is part of an RSU.

41. A non-transitory computer-readable medium storing instructions that, when executed by a hardware processor of a first station, causes the hardware processor to perform:

receiving from a second station a first message including an indication of whether a clock reconfiguration event occurs at the second station, wherein the reconfiguration event is at a local clock source of the second station and changes properties of the local clock at the second station and wherein the reconfiguration event at the local clock source changes a clock error between a first station and the second station;

transmitting to the second station a first PRS;

receiving from the second station a second PRS;

receiving from the second station a second message including a first time when the first PRS is received by the second station and a second time when the second PRS is transmitted by the second station; and determining an RTT between the first station and the second station based on the first time, the second time, a third time when the first station transmits the first PRS, a fourth time when the first station receives the second PRS, and the indication, wherein the indication is used to determine whether to utilize a previous estimate of clock error associated with the local clock of the second station in conjunction with a Quasi CoLocation (QCL) operation or whether to disable the QCL operation and generate a new estimate of the clock error.

42. The non-transitory computer-readable medium of claim 41, wherein the first PRS and the second PRS are transmitted via a V2X sidelink and an associated sidelink protocol; and wherein the V2X sidelink is within an ITS frequency spectrum including 5.9 GHz.

43. The non-transitory computer-readable medium of claim 41, wherein the first station is part of a vehicle, and wherein the second station is part of an RSU.

* * * * *